US009172972B2

(12) United States Patent
Chong et al.

(10) Patent No.: US 9,172,972 B2
(45) Date of Patent: Oct. 27, 2015

(54) LOW COMPLEXITY INTERPOLATION FILTERING WITH ADAPTIVE TAP SIZE

(75) Inventors: In Suk Chong, San Diego, CA (US); Liwei Guo, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 912 days.

(21) Appl. No.: 13/342,901

(22) Filed: Jan. 3, 2012

(65) Prior Publication Data

US 2012/0170650 A1 Jul. 5, 2012

Related U.S. Application Data

(60) Provisional application No. 61/430,101, filed on Jan. 5, 2011.

(51) Int. Cl.
*H04B 1/66* (2006.01)
*H04N 7/12* (2006.01)
(Continued)

(52) U.S. Cl.
CPC ........... *H04N 19/523* (2014.11); *H04N 19/117* (2014.11); *H04N 19/129* (2014.11); *H04N 19/134* (2014.11); *H04N 19/136* (2014.11); *H04N 19/159* (2014.11); *H04N 19/174* (2014.11); *H04N 19/176* (2014.11); *H04N 19/177* (2014.11); *H04N 19/179* (2014.11); *H04N 19/182* (2014.11); *H04N 19/184* (2014.11); *H04N 19/188* (2014.11); *H04N 19/433* (2014.11); *H04N 19/44* (2014.11); *H04N 19/46* (2014.11); *H04N 19/50* (2014.11); *H04N 19/51* (2014.11); *H04N 19/513* (2014.11); *H04N 19/52* (2014.11); *H04N 19/587* (2014.11);
(Continued)

(58) Field of Classification Search
None
See application file for complete search history.

(56) References Cited

U.S. PATENT DOCUMENTS 7,349,473 B2  3/2008 Hallapuro et al.
2009/0257493 A1 10/2009 Ye et al.
(Continued)

FOREIGN PATENT DOCUMENTS

EP    1746839 A1    1/2007
EP    2262267 A1   12/2010
(Continued)

OTHER PUBLICATIONS

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
(Continued)

*Primary Examiner* — Anner Holder
*Assistant Examiner* — Ellyar Y Barazesh
(74) *Attorney, Agent, or Firm* — Shumaker & Sieffert, P.A.

(57) ABSTRACT

During a prediction stage of video coding, a video coder may use relatively longer interpolation filters to generate predictive sub-pixel values using values of reference integer pixels of a reference block of video data positioned in parallel relative to a scanning order associated with the block and may use relatively shorter interpolation filters to generate predictive sub-pixel values using values of reference integer pixels of the block positioned perpendicular relative to the scanning order, wherein a longer interpolation filter generally refers to a filter with relatively more filter coefficients, or "taps," and a shorter filter generally refers to a filter with relatively fewer taps.

61 Claims, 10 Drawing Sheets

(51) Int. Cl.

| | | |
|---|---|---|
| *H04N 11/02* | (2006.01) | |
| *H04N 11/04* | (2006.01) | |
| *G06K 9/40* | (2006.01) | |
| *G06K 9/00* | (2006.01) | |
| *H04N 19/523* | (2014.01) | |
| *H04N 19/593* | (2014.01) | |
| *H04N 19/52* | (2014.01) | |
| *H04N 19/51* | (2014.01) | |
| *H04N 19/159* | (2014.01) | |
| *H04N 19/184* | (2014.01) | |
| *H04N 19/136* | (2014.01) | |
| *H04N 19/174* | (2014.01) | |
| *H04N 19/59* | (2014.01) | |
| *H04N 19/44* | (2014.01) | |
| *H04N 19/177* | (2014.01) | |
| *H04N 19/587* | (2014.01) | |
| *H04N 19/176* | (2014.01) | |
| *H04N 19/129* | (2014.01) | |
| *H04N 19/179* | (2014.01) | |
| *H04N 19/513* | (2014.01) | |
| *H04N 19/80* | (2014.01) | |
| *H04N 19/169* | (2014.01) | |
| *H04N 19/50* | (2014.01) | |
| *H04N 19/46* | (2014.01) | |
| *H04N 19/134* | (2014.01) | |
| *H04N 19/117* | (2014.01) | |
| *H04N 19/182* | (2014.01) | |
| *H04N 19/433* | (2014.01) | |

(52) U.S. Cl.
CPC ............. *H04N19/59* (2014.11); *H04N 19/593* (2014.11); *H04N 19/80* (2014.11)

(56) References Cited

U.S. PATENT DOCUMENTS

| | | | |
|---|---|---|---|
| 2009/0257494 A1 | 10/2009 | Ye et al. | |
| 2009/0257499 A1 | 10/2009 | Karczewicz et al. | |
| 2009/0257500 A1 | 10/2009 | Karczewicz et al. | |
| 2009/0257501 A1 | 10/2009 | Ye et al. | |
| 2009/0257502 A1 | 10/2009 | Ye et al. | |
| 2009/0257668 A1 | 10/2009 | Ye et al. | |
| 2010/0002770 A1 | 1/2010 | Motta et al. | |
| 2010/0046851 A1* | 2/2010 | Inoue et al. | 382/260 |
| 2010/0123824 A1* | 5/2010 | Wada | 348/448 |
| 2010/0135398 A1* | 6/2010 | Wittmann et al. | 375/240.16 |
| 2010/0220788 A1* | 9/2010 | Wittmann et al. | 375/240.16 |
| 2010/0246692 A1 | 9/2010 | Rusanovskyy et al. | |
| 2010/0296587 A1* | 11/2010 | Rusanovskyy et al. | 375/240.29 |
| 2011/0243471 A1 | 10/2011 | Alshina et al. | |
| 2011/0249737 A1 | 10/2011 | Joshi et al. | |

FOREIGN PATENT DOCUMENTS

| | | |
|---|---|---|
| JP | 2004007337 A | 1/2004 |
| JP | 2005532725 A | 10/2005 |
| JP | 2008113106 A | 5/2008 |
| WO | WO2004006558 A2 | 1/2004 |
| WO | 2008069073 A1 | 6/2008 |
| WO | 2009153104 A1 | 12/2009 |
| WO | WO2010049916 A1 | 5/2010 |
| WO | 2010143583 A1 | 12/2010 |

OTHER PUBLICATIONS

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

International Preliminary Report on Patentability from International application No. PCT/US2012/020217, dated Mar. 28, 2013, 30 pp.

Written Opinion of international application No. PCT/US2012/020217, dated Nov. 28, 2012, 8 pp.

International Search Report and Written Opinion of international application No. PCT/US2012/020217, dated Mar. 16, 2012, 17 pp.

Dong, J. et al., "Adaptive Interpolation Filter for Video Coding," H.265.net, Jul. 21, 2010, 3 pp., Retrieved from the Internet: URL: http://www.h265.net/2010/07/adaptive-interpolation-filter-for-video-coding.html [retrieved on Mar. 30, 2012].

Minoo, K. et al., "Reverse, Sub-Pixel Block Matching: Applications within H.264 and Analysis of Limitations," IEEE Image Processing, Oct. 2006, 4 pp.

Rao, K.R. et al., "Current Video Coding Standards: H.264/AVC, Dirac, AVS China and VC-1," IEEE Symposium on System Theory, Mar. 7-9, 2010, 8 pp.

Wedi, T. et al., "Results on complexity and coding performance investigations: displacement vector resolution and interpolation filter tap size", International Telecommunication Union—Telecommunications Standardization Sector, Document VCEG-M46, Apr. 2-4, 2011, 8 pp.

Wang, R. et al., "Partition-Level Adaptive Interpolation Filter for Video Coding", IEEE Multimedia and Expo, Jun. 2009, 4 pp.

Wittmann, S. et al., "Separable adaptive interpolation filter" International Telecommunication Union, Document COM16-C219-E, Jun. 1, 2007, 19 pp.

Vatis, Y. et al., "Comparison of Complexity Between Two-Dimensional Non-Separable Adaptive Interpolation Filter and Standard Wiener Filter," International Telecommunications Union, Document VCEG-AA11, Apr. 16-22, 2005, 4 pp.

International Telecommunication Union, "Series H: Audiovisual and Multimedia Systems, Infrastructure of audiovisual services—Coding of moving video," ITU-T H.264, Advanced video coding for generic audiovisual services, Mar. 2010, 669 pp.

\* cited by examiner

FIG. 7
FIG. 8

FIG. 9            FIG. 10

LOW COMPLEXITY INTERPOLATION FILTERING WITH ADAPTIVE TAP SIZE

This application claims the benefit of U.S. Provisional Application 61/430,101 filed on Jan. 5, 2011, the entire contents of which are incorporated herein by reference.

TECHNICAL FIELD

This disclosure relates to digital video encoding and decoding and, more particularly, to filtering techniques applied to generate predictive data used in the video encoding and decoding processes.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

Interpolation filtering techniques have been developed in order to improve the level of compression that can be achieved in inter-predictive coding of blocks of video data. According to these techniques, predictive data, e.g., a predictive block, generated during motion compensation for a particular block of video data being coded may be generated by interpolating values of pixels of a reference block of video data of a reference video frame, or another reference coded unit, used in motion estimation for the block. Interpolation filtering, or simply "interpolation," is often performed to generate predictive half pixel (e.g., "half-pel") and quarter pixel (e.g., "quarter-pel") values that define the predictive block. The half- and quarter-pel values correspond to sub-pixel positions within the reference block. Fractional motion vectors may be used to identify the predictive block within the reference block at such sub-pixel resolution in order to capture fractional movement in a video sequence, and thereby provide a predictive block that is more similar to the block being coded than the original reference block, i.e., the reference block at integer pixel resolution.

SUMMARY

In general, this disclosure describes interpolation filtering techniques performed by a video coding system during a prediction stage of a video coding process. The described techniques may, in some instances, reduce complexity of the video coding system and reduce the number of memory accesses performed by the system when generating predictive data for a block of video data, while still providing desirable video compression and reconstructed video quality. There are several aspects to this disclosure, including the use of relatively longer (i.e. including more filter coefficients or "taps") interpolation filters to generate predictive sub-pixel values when using values of reference integer pixels of a reference block of video data positioned in parallel relative to a scanning order associated with the reference block, and relatively shorter interpolation filters (i.e. including fewer taps) to generate predictive sub-pixel values when using values of reference integer pixels of the reference block positioned perpendicular relative to the scanning order.

In one example, a method of coding blocks of video data includes obtaining a block of pixels comprising integer pixel values corresponding to integer pixel positions within the block, and computing sub-pixel values corresponding to sub-pixel positions associated with the block. Computing the sub-pixel values includes computing a first sub-pixel value by applying a first interpolation filter defining a first one-dimensional array of filter coefficients corresponding to a first set of filter support positions within the block, and computing a second sub-pixel value by applying a second interpolation filter defining a second one-dimensional array of filter coefficients corresponding to a second set of filter support positions within the block, wherein the first one-dimensional array is selected to comprise more filter coefficients than the second one-dimensional array based on a scanning order associated with the block. The method further includes generating a prediction block of pixels based on one or more of the computed sub-pixel values.

In another example, an apparatus for coding blocks of video data includes a video coder configured to obtain a block of pixels comprising integer pixel values corresponding to integer pixel positions within the block, and compute sub-pixel values corresponding to sub-pixel positions associated with the block. To compute the sub-pixel values, the video coder is configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. The first one-dimensional array is selected to comprise more filter coefficients than the second one-dimensional array based on a scanning order associated with the block. The video coder is further configured to generate a prediction block of pixels based on one or more of the computed sub-pixel values.

In another example, a device for coding blocks of video data includes means for obtaining a block of pixels comprising integer pixel values corresponding to integer pixel positions within the block, and means for computing sub-pixel values corresponding to sub-pixel positions associated with the block. The means for computing the sub-pixel values includes means for computing a first sub-pixel value by applying a first interpolation filter defining a first one-dimensional array of filter coefficients corresponding to a first set of filter support positions within the block, and means for computing a second sub-pixel value by applying a second interpolation filter defining a second one-dimensional array of filter coefficients corresponding to a second set of filter support positions within the block, wherein the first one-dimensional array is selected to comprise more filter coefficients than the second one-dimensional array based on a scanning order associated with the block. The device further includes means for generating a prediction block of pixels based on one or more of the computed sub-pixel values.

The techniques described in this disclosure may be implemented in hardware, software, firmware, or combinations thereof. If implemented in hardware, an apparatus may be realized as an integrated circuit, a processor, discrete logic, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a tangible computer-readable medium and loaded and executed in the processor.

Accordingly, this disclosure also contemplates a computer-readable storage medium including instructions that, when executed, cause a processor to code blocks of video data, wherein the instructions cause the processor to obtain a block of pixels comprising integer pixel values corresponding to integer pixel positions within the block, and compute sub-pixel values corresponding to sub-pixel positions associated with the block. The instructions that cause the processor to compute the sub-pixel values include instructions that cause the processor to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block, wherein the first one-dimensional array is selected to comprise more filter coefficients than the second one-dimensional array based on a scanning order associated with the block. The instructions further cause the processor to generate a prediction block of pixels based on one or more of the computed sub-pixel values.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram that illustrates an 8-tap interpolation filter with coefficient symmetry, and corresponding horizontal filter support positions relative to a sub-pixel position.

FIG. 8 is a conceptual diagram that illustrates an 8-tap interpolation filter without coefficient symmetry, and corresponding horizontal filter support positions relative to a sub-pixel position.

FIG. 9 is a conceptual diagram that illustrates a 6-tap interpolation filter with coefficient symmetry, and corresponding vertical filter support positions relative to a sub-pixel position.

FIG. 10 is a conceptual diagram that illustrates a 6-tap interpolation filter without coefficient symmetry, and corresponding vertical filter support positions relative to a sub-pixel position.

DETAILED DESCRIPTION

Figure 1:
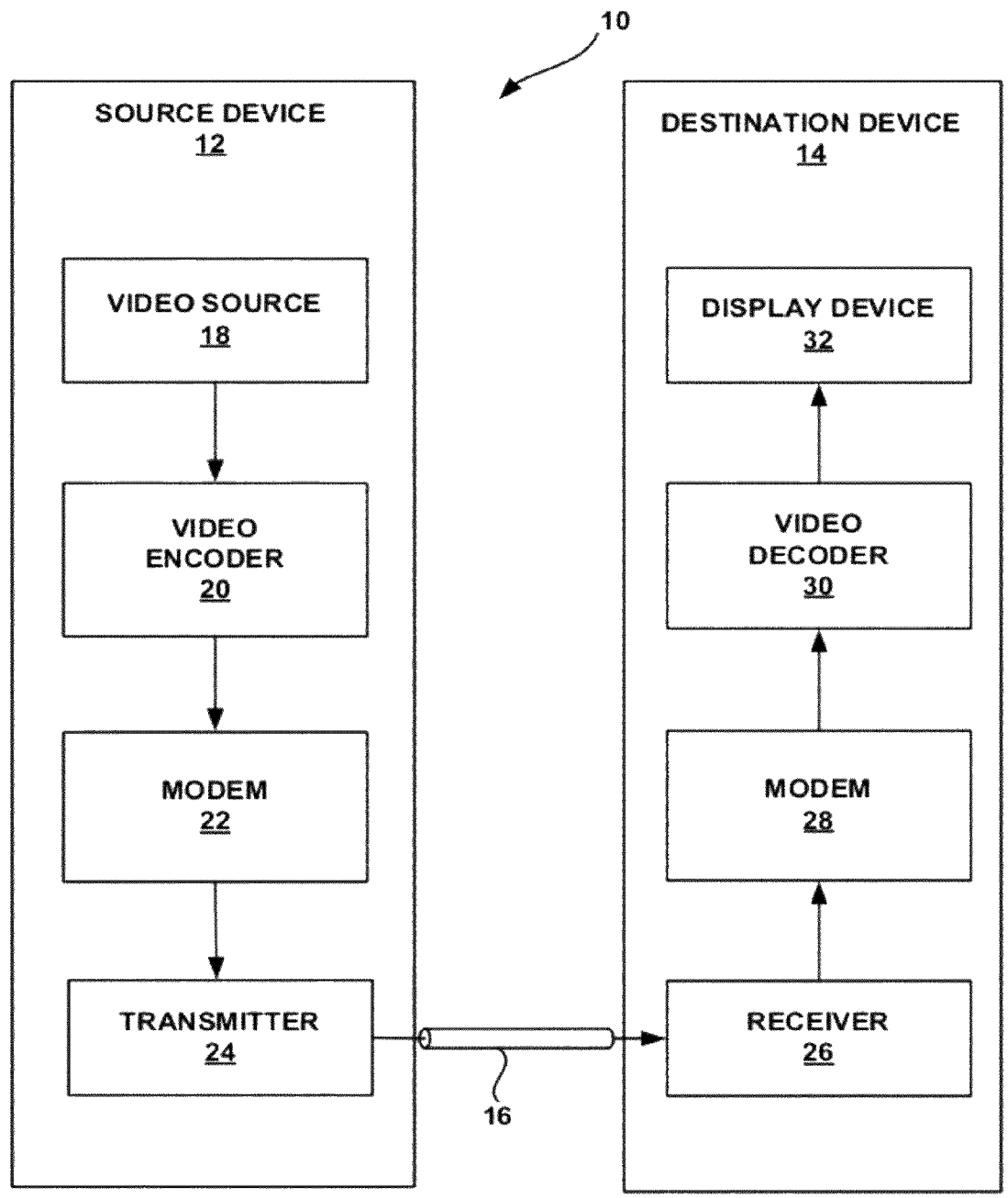
FIG. 1 is a block diagram that illustrates an example of a video encoding and decoding system that may implement techniques for coding blocks of video data using low complexity interpolation filters with adaptive tap size, consistent with the techniques of this disclosure.

This disclosure generally describes interpolation filtering techniques performed by a video coding system during a prediction stage of a video coding process. The described techniques may reduce complexity of the video coding system and reduce the number of memory accesses performed by the system when generating predictive data for a block of video data, while providing desirable video compression and reconstructed video quality. There are several aspects to this disclosure, including the use of relatively longer interpolation filters (i.e. including more filter coefficients or "taps") to generate predictive sub-pixel values when using values of reference integer pixels of a reference block of video data positioned in parallel relative to a scanning order associated with the reference block, and relatively shorter interpolation filters (i.e. including fewer taps) to generate predictive sub-pixel values when using values of reference integer pixels of the reference block positioned perpendicular relative to the scanning order.

In this disclosure, the term "coding" refers to encoding that occurs at the encoder or decoding that occurs at the decoder. Similarly, the term coder refers to an encoder, a decoder, or a combined encoder/decoder (CODEC). In some instances, a video encoder may include capabilities for decoding video. The terms coder, encoder, decoder and CODEC all refer to specific machines designed for the coding (encoding and/or decoding) of video data consistent with this disclosure.

In general, when designing interpolation filters for purposes of generating predictive data for coded blocks of video data, it may be desirable to use relatively longer interpolation filters, i.e. interpolation filters comprising relatively more filter coefficients (e.g., filters with 8 filter coefficients, or "taps," instead of 6 taps). Each filter coefficient of a particular interpolation filter may correspond to a reference integer pixel, also referred to as a filter support position, of a reference block of video data. Thus, each filter coefficient of the interpolation filter (e.g., represented as a value) may be associated with a value of its respective reference integer pixel of the reference block, which serves as a filter support position for the interpolation filter. Accordingly, using longer interpolation filters with more filter coefficients to generate predictive sub-pixel values for a coded block of video data may result in using relatively more reference integer pixels values. Using the longer interpolation filters in this manner may result in generating better predictive data for the coded block, i.e., predictive data that is more similar to the coded block. Better predictive data for the block may result in better reconstructed video quality and may also result in generating less residual data for the block, and thus may improve compression of the coded block.

Using longer interpolation filters as described above, however, may also result in greater complexity of a video coding system using the interpolation filters. For example, because the longer interpolation filters comprise relatively more filter coefficients, computing predictive sub-pixel values using the interpolation filters may be more complex. For example, the coding process may require more inputs (e.g., values of reference integer pixels), terms (e.g., values of filter coefficients multiplied by the values of the reference integer pixels), and/or operations (e.g., more multiplications and additions). Additionally, because the longer interpolation filters comprise relatively more filter coefficients as previously described, the number of memory accesses needed to retrieve reference integer pixel values to compute the predictive sub-pixel values may also increase, possibly adversely affecting overall performance of the video coding system.

Furthermore, in some cases, reference integer pixel values of a reference block of video data may be stored in a system memory (e.g., cache, or buffer memory) according to a scanning order associated with the reference block. For example, the scanning order associated with the reference block may correspond to a scanning order used to store integer pixel and sub-pixel values for various types of blocks of video data (e.g., reference blocks and predictive blocks) within the video coding system. In these cases, retrieving values of adjacent reference integer pixels of the reference block positioned according to the scanning order (e.g., horizontally within the reference block for a raster scanning order) from the system memory may require fewer memory accesses (i.e. "read" cycles) than retrieving values of adjacent reference integer pixels of the reference block not positioned according to the scanning order (e.g., positioned vertically within the reference block for the raster scanning order). For example, for a video coding system that includes a 32-bit data bus, where each reference integer pixel value is represented using an 8-bit code word, values of four adjacent reference integer pixels positioned according to the scanning order, e.g., in parallel relative to the scanning order, may be retrieved from the system memory using a single read cycle. On the other hand, for the same video coding system, values of four adjacent reference integer pixels not positioned according to the scanning order, e.g., perpendicular relative to the scanning order, may be retrieved from the system memory using as many as four separate read cycles, with each of the reference integer pixel values being retrieved using a separate read cycle.

In this disclosure, the phrases "parallel relative to the scanning order" and "perpendicular relative to the scanning order" are generally used to identify whether an interpolation filter uses horizontal filter support positions or vertical filter support positions. "Horizontal filter support positions" generally refers to a set of filter support positions that are in a common row of pixel data within a reference block of video data. "Vertical filter support positions" generally refers to a set of filter support positions that are in a common column of the pixel data. Depending on the scanning order, the phrase "parallel relative to the scanning order" can correspond to either horizontal filter support positions or vertical filter support positions. Likewise, depending on the scanning order, the phrase "perpendicular relative to the scanning order" can correspond to either horizontal filter support positions or vertical filter support positions. As one example, when referring to a horizontal (i.e. row-by-row) scanning order, the phrase "parallel relative to the scanning order" can refer to horizontal filter support positions, while the term "perpendicular relative to the scanning order" can refer to vertical filter support positions. The typical raster scanning order (i.e., left-to-right, top-to-bottom) is an example of a horizontal, or row-by-row, scanning order. In another example, when referring to a vertical (i.e., column-by-column) scanning order, the phrase "parallel relative to the scanning order" can refer to vertical filter support positions, while the phrase "perpendicular relative to the scanning order" can refer to horizontal filter support positions. The rotated raster scanning order is an example of a vertical, or column-by-column, scanning order. Additionally, in this disclosure, the phrase "positioned according to the scanning order" may generally be used to mean parallel relative to the scanning order, and the phrase "not positioned according to the scanning order" may generally be used to mean perpendicular relative to the scanning order.

As discussed above, because longer interpolation filters comprise relatively more filter coefficients, the number of memory accesses needed to retrieve reference integer pixel values to compute predictive sub-pixel values using the filters may increase. This increase may depend on the positions of the reference integer pixels relative to a scanning order associated with the reference block. Accordingly, the number of memory accesses may increase depending on the orientation of filter support positions associated with a particular interpolation filter (corresponding to reference integer pixels) within the reference block relative to the scanning order. For example, the number of memory accesses needed to retrieve values of reference integer pixels may be greater when retrieving a given number of values of reference integer pixels arranged perpendicular relative to the scanning order than when retrieving the same number of values of reference integer pixels arranged in parallel relative to the scanning order. That is, the number of memory accesses may be greater when filter support positions associated with a particular interpolation filter are arranged perpendicular relative to the scanning order, than when the same filter support positions are arranged in parallel relative to the scanning order.

To potentially obtain the benefit of the longer interpolation filters without the undesirable increase in complexity or increase in the number of memory accesses described above, the techniques of this disclosure include the use of a mixture of relatively longer and relatively shorter interpolation filters in an adaptive manner, depending on whether filter support positions associated with a particular interpolation filter are arranged in parallel relative to the scanning order or perpendicular relative to the scanning order. If, for example, a predictive sub-pixel value is to be generated using values of reference integer pixels of a reference block of video data positioned parallel relative to the scanning order, a longer interpolation filter may be used. If, however, a predictive sub-pixel value is to be generated using values of reference integer pixels of the reference block positioned perpendicular relative to the scanning order, a shorter interpolation filter may be used.

In this example, once again, the scanning order associated with the reference block may correspond to a scanning order used to store integer pixel and sub-pixel values for various types of blocks of video data within the video coding system. As such, retrieving values of adjacent reference integer pixels of the reference block positioned in parallel relative to the scanning order, from the system memory may require fewer memory accesses, or read cycles, than retrieving values of adjacent reference integer pixels of the reference block positioned perpendicular relative to the scanning order. Accordingly, the video coding system complexity may be reduced in some cases by using interpolation filters comprising fewer filter coefficients, and hence fewer corresponding reference integer pixel values, to generate the predictive sub-pixel values. Additionally, the number of memory accesses performed by the video coding system may be reduced in some cases by retrieving values of fewer reference integer pixels from the video coding system memory, or retrieving the values of the reference integer pixels using fewer memory accesses or read cycles, to generate the predictive sub-pixel values. As a result, the techniques of this disclosure may be of particular benefit to a video coding system such as a cellular telephone, PDA, or the like that has limited resources (e.g., hardware and/or software resources).

As used in this disclosure, the terms "longer" and "shorter" are generally intended to be relative terms. For example, a longer interpolation filter can be considered to include more filter coefficients than a shorter interpolation filter. Similarly, a shorter interpolation filter can be considered to include fewer filter coefficients than a longer interpolation filter. The terms "longer" and "shorter," however, are not intended to represent any sort of maximum or minimum number of filter coefficients for a particular interpolation filter. As will be shown by way of examples, the techniques of this disclosure are compatible with interpolation filters of numerous shapes and sizes.

Other aspects of this disclosure include techniques for encoding information in a bitstream to convey one or more of a number of filter coefficients included within a particular interpolation filter, and a value of each of the filter coefficients. These and other aspects of this disclosure will become apparent from the description below. Accordingly, the techniques of this disclosure may enable using low complexity interpolation filters with adaptive tap size when generating predictive data for one or more blocks of video data being coded.

FIG. 1 is a block diagram that illustrates an example of a video encoding and decoding system 10 that may implement techniques for coding blocks of video data using low complexity interpolation filters with adaptive tap size, consistent with the techniques of this disclosure. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices, such as wireless handsets, so-called cellular or satellite radiotelephones, or any wireless devices that can communicate video information over a communication channel 16, in which case communication channel 16 is wireless.

The techniques of this disclosure, however, which concern coding blocks of video data using low complexity interpolation filters with adaptive tap size, are not necessarily limited to wireless applications or settings. These techniques may generally apply to any scenario where encoding or decoding is performed, including over-the-air television broadcasts, cable television transmissions, satellite television transmissions, streaming Internet video transmissions, encoded digital video that is encoded onto a storage medium or retrieved and decoded from a storage medium, or other scenarios. Accordingly, communication channel 16 is not required and the techniques of this disclosure may apply to settings where encoding is applied or where decoding is applied, e.g., without any data communication between encoding and decoding devices.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In accordance with this disclosure, video encoder 20 of source device 12 and/or video decoder 30 of destination device 14 may be configured to apply the techniques for coding blocks of video data using low complexity interpolation filters with adaptive tap size. In other examples, a source device and a destination device may include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for coding blocks of video data using low complexity interpolation filters with adaptive tap size may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 28 demodulates the information. Again, the video encoding process described above may implement one or more of the techniques described herein to code blocks of video data using low complexity interpolation filters with adaptive tap size. The information communicated over channel 16 may include syntax information defined by video encoder 20, which is also used by video decoder 30, that includes syntax elements that describe characteristics and/or processing of blocks of video data (e.g., macroblocks, or coding units), e.g., motion vector data identifying predictive data for the blocks, and other information. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. In other examples, encoding or decoding devices may implement techniques of this disclosure without any communication between such devices. For example, an encoding device may encode and store an encoded bitstream consistent with the techniques of this disclosure. Alternatively, a decoding device may receive or retrieve an encoded bitstream, and decode the bitstream consistent with the techniques of this disclosure.

Video encoder 20 and video decoder 30 may operate according to a video compression standard, such as the ITU-T H.264 standard, alternatively referred to as MPEG-4, Part 10, Advanced Video Coding (AVC). The techniques of this disclosure, however, are not limited to any particular coding standard. Other examples include MPEG-2, ITU-T H.263, and the High Efficiency Video Coding (HEVC) standard presently under development. In general, the techniques of this disclosure are described with respect to HEVC, but it should be understood that these techniques may be used in conjunction with other video coding standards as well. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder and decoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. A video encoder, e.g., video encoder 20, typically operates on video blocks within individual video frames in order to encode the video data. According to the ITU-T H.264 standard, a video block may correspond to a macroblock or a partition of a macroblock. According to other standards, e.g., HEVC described in greater detail below, a video block may correspond to a coding unit (e.g., a largest coding unit), or a partition of a coding unit. The video blocks may have fixed or varying sizes, and may differ in size according to a specified coding standard. Each video frame may include a plurality of slices, i.e., portions of the video frame. Each slice may include a plurality of video blocks, which may be arranged into partitions, also referred to as sub-blocks.

Depending on the specified coding standard, video blocks may be partitioned into various "N×N" sub-block sizes, such as 16×16, 8×8, 4×4, 2×2, and so forth. In this disclosure, "N×N" and "N by N" may be used interchangeably to refer to the pixel dimensions of the block in terms of vertical and horizontal dimensions, e.g., 16×16 pixels or 16 by 16 pixels. In general, a 16×16 block will have sixteen pixels in a vertical direction (y=16) and sixteen pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N. As one example, in the ITU-T H.264 standard, blocks that are 16 by 16 pixels in size may be referred to as macroblocks, and blocks that are less than 16 by 16 pixels may be referred to as partitions of a 16 by 16 macroblock. In other standards, e.g., HEVC, blocks may be defined more generally with respect to their size, for example, as coding units and partitions thereof, each having a varying, rather than a fixed size.

Video blocks may comprise blocks of pixel data in the pixel domain, or blocks of transform coefficients in the transform domain, e.g., following application of a transform, such as a discrete cosine transform (DCT), an integer transform, a wavelet transform, or a conceptually similar transform to residual data for a given video block, wherein the residual data represents pixel differences between video data for the block and predictive data generated for the block. In some cases, video blocks may comprise blocks of quantized transform coefficients in the transform domain, wherein, following application of a transform to residual data for a given video block, the resulting transform coefficients are also quantized.

Block partitioning serves an important purpose in block-based video coding techniques. Using smaller blocks to code video data may result in better prediction of the data for locations of a video frame that include high levels of detail, and may therefore reduce the resulting error (i.e., deviation of the prediction data from source video data), represented as residual data. While potentially reducing the residual data, such techniques may, however, require additional syntax information to indicate how the smaller blocks are partitioned relative to a video frame, and may result in an increased coded video bitrate. Accordingly, in some techniques, block partitioning may depend on balancing the desirable reduction in residual data against the resulting increase in bitrate of the coded video data due to the additional syntax information.

In general, blocks and the various partitions thereof (i.e., sub-blocks) may be considered video blocks. In addition, a slice may be considered to be a plurality of video blocks (e.g., macroblocks, or coding units), and/or sub-blocks (partitions of macroblocks, or sub-coding units). Each slice may be an independently decodable unit of a video frame, sometimes referred to as a "coded unit." Alternatively, frames themselves may be independently decodable units, or other portions of a frame may be defined as independently decodable units. Furthermore, a GOP, also referred to as a sequence, may be defined as an independently decodable unit.

Efforts are currently in progress to develop a new video coding standard, currently referred to as High Efficiency Video Coding (HEVC). The emerging HEVC standard may also be referred to as H.265. The standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes, e.g., based on the size of a block being intra-prediction coded.

HM refers to a block of video data as a coding unit (CU). A CU may refer to a rectangular image region that serves as a basic unit to which various coding tools are applied for compression. In H.264, it may also be called a macroblock. Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be partitioned, or "split" into sub-CUs.

An LCU may be associated with a quadtree data structure that indicates how the LCU is partitioned. In general, a quadtree data structure includes one node per CU of an LCU, where a root node corresponds to the LCU, and other nodes correspond to sub-CUs of the LCU. If a given CU is split into four sub-CUs, the node in the quadtree corresponding to the split CU includes four child nodes, each of which corresponds to one of the sub-CUs. Each node of the quadtree data structure may provide syntax information for the corresponding CU. For example, a node in the quadtree may include a split flag for the CU, indicating whether the CU corresponding to the node is split into four sub-CUs. Syntax information for a given CU may be defined recursively, and may depend on whether the CU is split into sub-CUs.

A CU that is not split (i.e., a CU corresponding a terminal, or "leaf" node in a given quadtree) may include one or more prediction units (PUs). In general, a PU represents all or a portion of the corresponding CU, and includes data for retrieving a reference sample for the PU for purposes of performing prediction for the CU. For example, when the CU is intra-mode encoded, the PU may include data describing an intra-prediction mode for the PU. As another example, when the CU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel, or "quarter-pel" precision, or one-eighth pixel, or "eighth-pel" precision), a reference frame to which the motion vector points, and/or a reference list (e.g., list 0 or list 1) for the motion vector. Data for the CU defining the one or more PUs of the CU may also describe, for example, partitioning of the CU into the one or more PUs. Partitioning modes may differ between whether the CU is uncoded, intra-prediction mode encoded, or inter-prediction mode encoded.

A CU having one or more PUs may also include one or more transform units (TUs). Following prediction for a CU using one or more PUs, as described above, a video encoder may calculate one or more residual blocks for the respective portions of the CU corresponding to the one of more PUs. The residual blocks may represent a pixel difference between the video data for the CU and the predicted data for the one or more PUs. A set of residual values may be transformed, scanned, and quantized to define a set of quantized transform coefficients. A TU may define a partition data structure that indicates partition information for the transform coefficients that is substantially similar to the quadtree data structure described above with reference to a CU. A TU is not necessarily limited to the size of a PU. Thus, TUs may be larger or smaller than corresponding PUs for the same CU. In some examples, the maximum size of a TU may correspond to the size of the corresponding CU. In one example, residual samples corresponding to a CU may be subdivided into smaller units using a quadtree structure known as "residual quad tree" (RQT). In this case, the leaf nodes of the RQT may be referred to as the TUs, for which the corresponding residual samples may be transformed and quantized.

Following intra-predictive or inter-predictive encoding to produce predictive data and residual data, and following any transforms (such as the 4×4 or 8×8 integer transform used in H.264/AVC or a discrete cosine transform DCT) to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Following quantization, entropy coding of the quantized data (i.e., quantized transform coefficients) may be performed. The entropy coding may conform to any of a number of entropy coding techniques, such as context adaptive variable length coding (CAVLC), context adaptive binary arithmetic coding (CABAC), probability interval partitioning entropy coding (PIPE), or another entropy coding methodology. For example, coefficient values, represented as magnitudes and corresponding signs (e.g., "+1," or "−1") for the quantized transform coefficients may be encoded using the entropy coding techniques.

It should be noted that the prediction, transform, and quantization described above may be performed for any block of video data, e.g., to a PU and/or TU of a CU, or to a macroblock, depending on the specified coding standard. Accordingly, the techniques of this disclosure, relating to coding blocks of video data using low complexity interpolation filters with adaptive tap size, may apply to any block of video data, e.g., to any block of quantized transform coefficients, including a macroblock, or a TU of a CU. Furthermore, a block of video data (e.g., a macroblock, or a TU of a CU) may include each of a luminance component (Y), a first chrominance component (U), and a second chrominance component (V) of the corresponding video data. As such, the techniques of this disclosure may be performed for each of the Y, U, and V components of a given block of video data.

As previously described, longer interpolation filters, i.e., interpolation filters that comprise more filter coefficients, may generate better predictive data for coded blocks of video data compared to shorter interpolation filters. The longer interpolation filters may generate predictive blocks that are more similar, or that more closely match the coded blocks than predictive blocks generated using the shorter interpolation filters. Using the longer interpolation filters to generate the predictive data for the coded blocks, however, may also result in increased complexity and require a greater number of memory accesses, as previously described.

This disclosure describes techniques that may enable the coding of blocks of video data using coding systems that have lower complexity and that require fewer memory accesses relative to other systems. As one example, the coding system complexity and the number of memory accesses may be reduced by using a longer interpolation filter when generating a predictive sub-pixel value using values of reference integer pixels of a reference block of video data positioned according to a scanning order associated with the reference block (i.e. in parallel relative to the scanning order) and a shorter interpolation filter when generating a predictive sub-pixel value using values of reference integer pixels of the reference block not positioned according to the scanning order (i.e. positioned perpendicular relative to the scanning order). As a result, the predictive sub-pixel values may be generated using less complex computations, and the number of memory accesses may be reduced by retrieving values of fewer reference integer pixels from memory, and/or by retrieving the values using fewer read cycles.

In some examples, video encoder 20 of source device 12 may be configured to encode certain blocks of video data (e.g., one or more macroblocks, or TUs of a CU), and video decoder 30 of destination device 14 may be configured to receive the encoded video data from video encoder 20, e.g., from modem 28 and receiver 26. In any case, video encoder 20 and/or video decoder 30 may be configured to code a particular block of video data by generating a predictive block for the block being coded using a reference block of video data.

In accordance with the techniques of this disclosure, as one example, video encoder 20 and/or video decoder 30 may be configured to obtain a block of pixels comprising integer pixel values corresponding to integer pixel positions within the block, and compute sub-pixel values corresponding to sub-pixel positions associated with the block. For example, to compute the sub-pixel values, video encoder 20 and/or video decoder 30 may be configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. In this example, the first one-dimensional array may be selected to comprise more filter coefficients than the second one-dimensional array based on a scanning order associated with the block. Video encoder 20 and/or video decoder 30 may be further configured to generate a prediction block of pixels based on one or more of the computed sub-pixel values.

In this example, the first set of filter support positions can include filter support positions arranged in parallel relative to a scanning order associated with the block, and the second set of filter support positions can include filter support positions arranged perpendicular relative to the scanning order.

As used in this disclosure, the term "one-dimensional array of filter coefficients" is generally used to describe filter coefficients that have corresponding filter support positions in a single row of pixel data or a single column of pixel data within a reference block of video data. The term "two-dimensional array of filter coefficients" is generally used to describe filter coefficients that have corresponding filter support position in two or more rows of pixel data and two or more columns of pixel data of the reference block.

After generating the prediction block of pixels, or a "predictive block," using the low complexity interpolation filters with adaptive tap size in the manner described above, video encoder 20 and/or video decoder 30 may code a block of video data using the predictive block.

In this manner, video encoder 20 and/or video decoder 30 may use relatively longer interpolation filters to generate predictive sub-pixel values when using values of reference integer pixels of a reference block of video data positioned according a scanning order associated with the reference block (i.e. in parallel relative to the scanning order) and relatively shorter interpolation filters to generate predictive sub-pixel values when using values of reference integer pixels of the reference block not positioned according to the scanning order (i.e. positioned perpendicular relative to the scanning order). For example, as previously described, the scanning order associated with the reference block may correspond to a scanning order used to store integer pixel and sub-pixel values for various types of blocks of video data within the video coding system. In some examples, the scanning order associated with the reference block may comprise a horizontal (e.g. "raster") scanning order, or a vertical (e.g. "rotated raster") scanning order. In other examples, the scanning order associated with the reference block may comprise other scanning orders.

In any case, according to the techniques of this disclosure, when generating predictive sub-pixel values using values of reference integer pixels of the reference block positioned according to the scanning order, longer interpolation filters may be used, as retrieving the reference integer pixel values used by the interpolation filters generally requires relatively fewer memory read cycles. In this example, retrieving the reference integer pixel values from the system memory generally requires fewer memory read cycles than retrieving a same number of reference integer pixel values that are not positioned according to the scanning order. In this manner, the longer interpolation filters may include relatively more filter coefficients, possibly resulting in better predictive sub-pixel values relative to predictive sub-pixel values generated using relatively shorter interpolation filters.

In contrast, when generating predictive sub-pixel values using values of reference integer pixels of the reference block not positioned according to the scanning order (i.e. perpendicular relative to the scanning order), shorter interpolation filters may be used, as retrieving the reference integer pixel values used by the interpolation filters generally requires more memory accesses. In this example, retrieving the reference integer pixel values from the system memory generally requires more memory read cycles than retrieving a same number of reference integer pixel values that are positioned according to the scanning order. Accordingly, shorter interpolation filters that include relatively fewer filter coefficients can be used. Using the shorter interpolation filters can represent a desirable compromise between reducing complexity and the number of memory accesses of the video coding system and generating good prediction data. For example, by using interpolation filters that include fewer filter coefficients in this example, the techniques of this disclosure enable using video coding systems with reduced complexity and reduced number of memory accesses, while generating sufficiently good predictive sub-pixel values, as also previously described.

According to the techniques of this disclosure, filter support positions within the reference block associated with the longer interpolation filter may be arranged in parallel relative to the scanning order, and filter support positions within the reference block associated with the shorter interpolation filter may be arranged perpendicular relative to the scanning order. As one example, when the scanning order comprises a horizontal (i.e. row-by-row) scanning order, the interpolation filters that are associated with horizontal filter support positions within the reference block may comprise relatively longer interpolation filters with more filter coefficients, while the interpolation filters that are associated with vertical filter support positions within the reference block may comprise relatively shorter filters with fewer filter coefficients. Similarly, as another example, when the scanning order comprises a vertical (i.e. column-by-column) scanning order, the interpolation filters that are associated with vertical filter support positions within the reference block may comprise relatively longer interpolation filters with more filter coefficients, while the interpolation filters that are associated with horizontal filter support positions within the reference block may comprise relatively shorter interpolation filters with fewer filter coefficients.

As one example, when a predictive block is generated for a coded block of video data based on a square N×N reference block of video data, longer interpolation filters may be used to generate predictive sub-pixel values of the predictive block using values of reference integer pixels of the reference block positioned according to a scanning order associated with the reference block. Furthermore, in this example, shorter interpolation filters may be used to generate predictive sub-pixel values of the predictive block using values of reference integer pixels of the reference block not positioned according to the scanning order.

As illustrated by this example, although using relatively longer interpolation filters may generally be advantageous to generate better predictive data for a coded block of video data, as previously described, according to the techniques of this disclosure, relatively longer and relatively shorter interpolation filters may be used to generate the predictive data in some instances. In other words, rather than always using a longest possible interpolation filter (e.g., an interpolation filter that has a length that corresponds to the dimension of the reference block, or an "N-tap" interpolation filter), the techniques of this disclosure propose using a shorter interpolation filter (e.g., an "(N−2)-tap" interpolation filter) when generating predictive sub-pixel values of the predictive block using values of reference integer pixels of the reference block not positioned according to the scanning order.

For example, when the N×N reference block comprises an 8×8 block of video data, and when the scanning order associated with the reference block comprises a horizontal scanning order, a horizontal interpolation filter used to generate the predictive sub-pixel values may include 8 filter coefficients, while a vertical interpolation filter used to generate the predictive sub-pixels may include 6, rather than 8, filter coefficients, as one example. Accordingly, some reference integer pixels of the reference block in the vertical dimension may be unused for purposes of interpolation filtering to generate the predictive block. As another example, when the predictive block is generated for the coded block of video data based on a non-square N×M reference block of video data, once again, longer interpolation filters may be used to generate predictive sub-pixel values of the predictive block using values of reference integer pixels of the reference block positioned according to the scanning order associated with the reference block. Similarly, shorter interpolation filters may be used to generate predictive sub-pixel values of the predictive block using values of reference integer pixels of the reference block not positioned according to the scanning order.

As illustrated by this example, rather than always using a longest possible interpolation filter (e.g., an interpolation filter that has a length that corresponds to a corresponding dimension of the reference block, that is, an "N-tap" or an "M-tap" interpolation filter), the techniques of this disclosure propose using a shorter interpolation filter when generating predictive sub-pixel values of the predictive block using values of reference integer pixels of the reference block not positioned according to the scanning order, or positioned perpendicular relative to the scanning order.

In this manner, whether a horizontal interpolation filter uses more filter coefficients than a vertical interpolation filter, or vice versa, can be selected based on a scanning order of a reference block, as opposed to, for example, a shape of the block. This selection may, for example, be defined as part of a video coding standard where both a video encoder and a video decoder perform interpolation filtering according to the standard. In such an implementation, the video encoder may determine and signal more filter coefficients for interpolation filters that are parallel relative to the scanning order than for interpolation filters that are perpendicular relative to the scanning order. In other implementations, however, a video decoder may operate independently of a standard or may implement optimizations to a standard. In such an implementation, a video encoder may determine and signal a certain number of filter coefficients for an interpolation filter that is perpendicular relative to the scanning order, but the video decoder may not apply all of the signaled filter coefficients. For example, for an interpolation filter that is perpendicular relative to the scanning order, the video encoder may signal 8 filter coefficients, but the video decoder may only store and/or apply 6 of the 8 filter coefficients.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
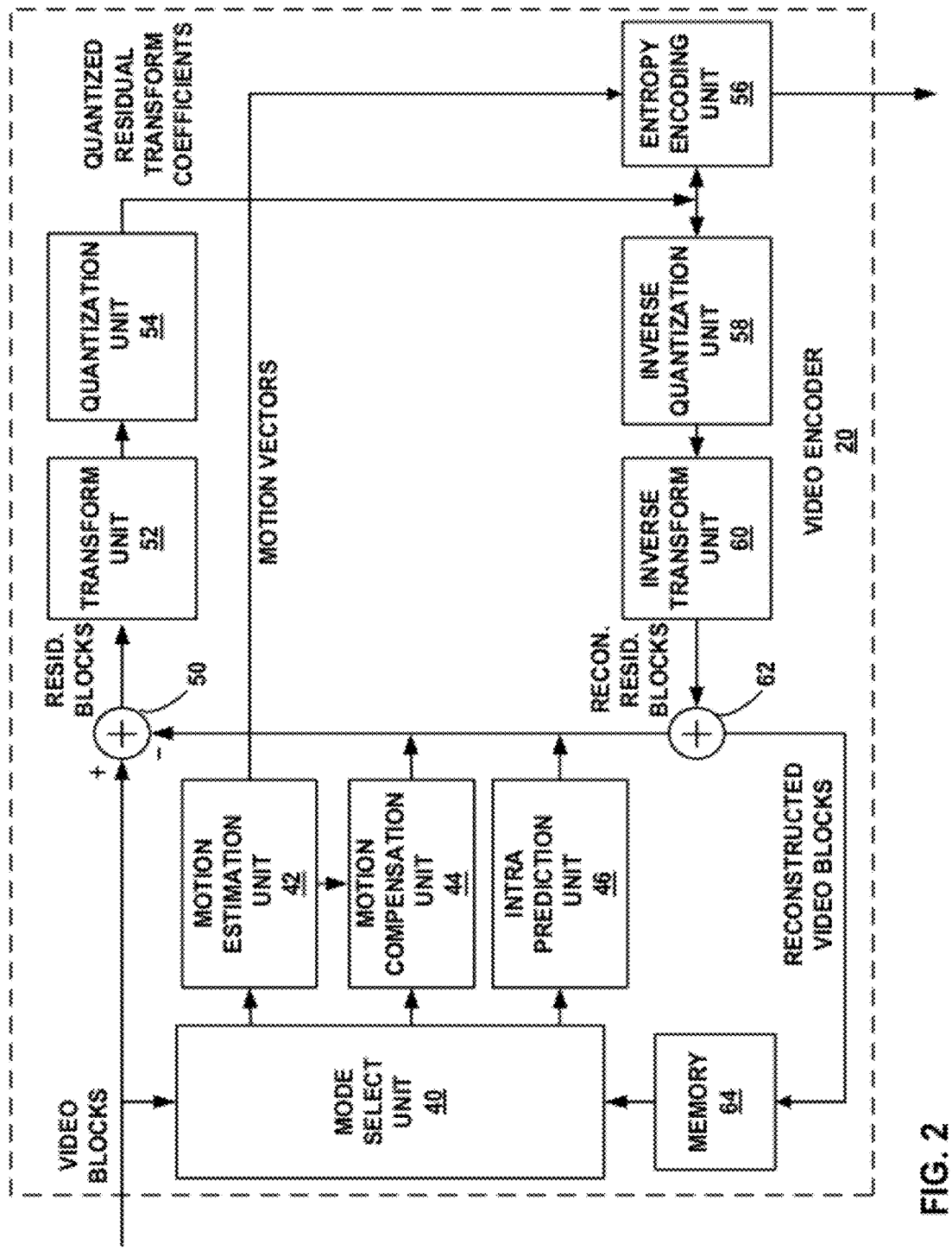
FIG. 2 is a block diagram that illustrates an example of a video encoder that may implement techniques for encoding blocks of video data using low complexity interpolation filters with adaptive tap size, consistent with the techniques of this disclosure.

FIG. 2 is a block diagram that illustrates an example of a video encoder 20 that may implement techniques for encoding blocks of video data using low complexity interpolation filters with adaptive tap size, consistent with the techniques of this disclosure. Video encoder 20 may perform intra- and inter-coding of blocks within video frames, including macroblocks, CUs, and partitions or sub-partitions thereof. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to any of several spatial based compression modes, and inter-modes, such as uni-directional prediction (P-mode) or bi-directional prediction (B-mode), may refer to any of several temporal-based compression modes.

As shown in FIG. 2, video encoder 20 receives a current block of video data within a video frame to be encoded. In the example of FIG. 2, video encoder 20 includes motion compensation unit 44, motion estimation unit 42, memory 64, summer 50, transform module 52, quantization unit 54, and entropy encoding unit 56. For video block reconstruction, video encoder 20 also includes inverse quantization unit 58, inverse transform module 60, and summer 62. A deblocking filter (not shown in FIG. 2) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks. Motion estimation unit 42 and motion compensation unit 44 may perform inter-predictive coding of a given received video block relative to one or more blocks in one or more reference frames to provide temporal compression. Intra-prediction module 46 may perform intra-predictive coding of a given received video block relative to one or more neighboring blocks in the same frame or slice as the block to be coded to provide spatial compression.

Mode select unit 40 may select one of the coding modes, i.e., one mode or multiple intra- or inter-coding modes, based on coding results (e.g., resulting coding rate and level of distortion), and based on a frame or slice type for the frame or slice including the given received block being coded, and provide the resulting intra- or inter-coded block to summer 50 to generate residual block data and to summer 62 to reconstruct the encoded block for use in a reference frame or reference slice. In general, intra-prediction involves predicting a current block relative to neighboring, previously coded blocks, while inter-prediction involves motion estimation and motion compensation to temporally predict the current block.

Motion estimation unit 42 and motion compensation unit 44 represent the inter-prediction elements of video encoder 20. Motion estimation unit 42 and motion compensation unit 44 may be highly integrated, but are illustrated separately for conceptual purposes. Motion estimation is the process of generating motion vectors, which estimate motion for video blocks. A motion vector, for example, may indicate the displacement of a predictive block within a predictive reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. A motion vector may also indicate displacement of a partition of a block. Motion compensation may involve fetching or generating the predictive block based on the motion vector determined by motion estimation. Again, motion estimation unit 42 and motion compensation unit 44 may be functionally integrated, in some examples.

Motion estimation unit 42 may calculate a motion vector for a video block of an inter-coded frame by comparing the video block to video blocks of a reference frame in memory 64. Motion compensation unit 44 may also interpolate sub-integer pixels of the reference frame, e.g., an I-frame or a P-frame, for the purposes of this comparison. The ITU H.264 standard, as an example, describes two lists: list 0, which includes reference frames having a display order earlier than a current frame being encoded, and list 1, which includes reference frames having a display order later than the current frame being encoded. Therefore, data stored in memory 64 may be organized according to these lists.

Motion estimation unit 42 may compare blocks of one or more reference frames from memory 64 to a block to be encoded of a current frame, e.g., a P-frame or a B-frame. When the reference frames in memory 64 include values for sub-integer pixels, a motion vector calculated by motion estimation unit 42 may refer to a sub-integer pixel location of a reference frame. Motion estimation unit 42 and/or motion compensation unit 44 may also be configured to calculate values for sub-integer pixel positions of reference frames stored in memory 64 if no values for sub-integer pixel positions are stored in memory 64. Motion estimation unit 42 may send the calculated motion vector to entropy encoding unit 56 and motion compensation unit 44. The reference frame block identified by a motion vector may be referred to as an inter-predictive block, or, more generally, a predictive block. Motion compensation unit 44 may calculate prediction data based on the predictive block.

Intra-prediction module 46 may intra-predict a current block, as an alternative to the inter-prediction performed by motion estimation unit 42 and motion compensation unit 44, as described above. In particular, intra-prediction module 46 may determine an intra-prediction mode to use to encode a current block. In some examples, intra-prediction module 46 may encode a current block using various intra-prediction modes, e.g., during separate encoding passes, and intra-prediction module 46 (or mode select unit 40, in some examples) may select an appropriate intra-prediction mode to use from the tested modes. For example, intra-prediction module 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction module 46 may calculate ratios from the distortions and rates for the various encoded blocks to determine which intra-prediction mode exhibits the best rate-distortion value for the block.

After predicting a current block, e.g., using intra-prediction or inter-prediction, video encoder 20 may form a residual video block by subtracting the prediction data calculated by motion compensation unit 44 or intra-prediction module 46 from the original video block being coded. Summer 50 represents the component or components that may perform this subtraction operation. Transform module 52 may apply a transform, such as a discrete cosine transform (DCT) or a conceptually similar transform, to the residual block, producing a video block comprising residual transform coefficient values. Transform module 52 may perform other transforms, such as those defined by the H.264 standard, which are conceptually similar to DCT. Wavelet transforms, integer transforms, sub-band transforms or other types of transforms could also be used. In any case, transform module 52 may apply the transform to the residual block, producing a block of residual transform coefficients. The transform may convert the residual information from a pixel domain to a transform domain, such as a frequency domain. Quantization unit 54 may quantize the residual transform coefficients to further reduce bit rate. The quantization process may reduce the bit depth associated with some or all of the coefficients. The degree of quantization may be modified by adjusting a quantization parameter.

Following quantization, entropy encoding unit 56 may entropy encode the quantized transform coefficients, which may include using CAVLC, CABAC, PIPE, or another entropy coding methodology. Following the entropy coding by entropy encoding unit 56, the encoded video may be transmitted to another device or archived for later transmission or retrieval.

In some cases, entropy encoding unit 56 or another unit of video encoder 20 may be configured to perform other coding functions, in addition to entropy coding quantized transform coefficients as described above. For example, entropy encoding unit 56 may construct header information for the block (e.g., macroblock, CU, or LCU), or video frame containing the block, with appropriate syntax elements for transmission in the encoded video bitstream. According to some coding standards, such syntax elements may include motion vector data for the block used to generate predictive data for the block, as previously described. As also previously described, the motion vector data may be used to generate the predictive data using interpolation filters, which may increase complexity and the number memory accesses of video encoder 20 in generating the predictive data. As such, this disclosure describes techniques that may reduce the complexity and the number of memory accesses of video encoder 20 when generating the predictive data using the motion vector data.

As described above, motion estimation unit 42 may perform motion estimation of a block of video data with fractional pixel (or "sub-pixel") precision. When motion estimation unit 42 uses fractional pixel motion estimation, motion estimation unit 42 may generate motion vector data at sub-pixel resolution (e.g., motion vector data corresponding to sub-pixel, or fractional pixel values) using interpolation filtering techniques described in this disclosure. In other words, the interpolation filtering techniques may be used to compute values at positions between integer pixel positions within a reference block of video data. Sub-pixel positions located half-way between two adjacent integer pixel positions within the reference block may be referred to as half-pixel (or "half-pel") positions, sub-pixel positions located half-way between an integer-pixel position and a half-pixel position within the reference block may be referred to as quarter-pixel (or "quarter-pel") positions, sub-pixel positions located half-way between an integer-pixel position, or a half-pixel position, and a quarter-pixel position may be referred to as eighth-pixel (or "eighth-pel") positions, and so forth. Motion compensation unit 44 may, in turn, use the motion vector data generated by motion estimation unit 42 to generate the predictive block to perform motion compensation of the block of video data being coded. Motion estimation unit 42 may also signal the motion vector data to a video decoder, e.g., video decoder 30, to be used to decode the encoded block of video data.

In some examples, video encoder 20 may be configured to encode certain blocks of video data (e.g., one or more macroblocks, or TUs of a CU). For example, video encoder 20 may be configured to encode a particular block of video data by generating a predictive block for the block being encoded using a reference block of video data.

In accordance with the techniques of this disclosure, as one example, video encoder 20 may be configured to obtain a block of pixels comprising integer pixel values corresponding to integer pixel positions within the block, and compute sub-pixel values corresponding to sub-pixel positions associated with the block. For example, to compute the sub-pixel values, video encoder 20 may be configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. In this example, the first one-dimensional array may be selected to comprise more filter coefficients than the second one-dimensional array based on a scanning order associated with the block. Video encoder 20 may be further configured to generate a prediction block of pixels based on one or more of the computed sub-pixel values. In this example, the first set of filter support positions can include filter support positions arranged in parallel relative to a scanning order associated with the block, and the second set of filter support positions can include filter support positions arranged perpendicular relative to the scanning order.

In some examples, one of the first set of filter support positions and the second set of filter support positions may comprise a set of horizontal filter support positions arranged in a common row within the block, and another one of the first set of filter support positions and the second set of filter support positions may comprise a set of vertical filter support positions arranged in a common column within the block.

In one example, the first one-dimensional array of filter coefficients may comprise 8 coefficients, and the second one-dimensional array of filter coefficients may comprise 6 coefficients. Similarly, in another example, the first one-dimensional array of filter coefficients may comprise 8 coefficients, and the second one-dimensional array of filter coefficients may comprise 7 coefficients.

In other examples, at least one of the first set of filter support positions and the second set of filter support positions may correspond to a set of integer pixel positions within the block.

In still other examples, at least one of the first sub-pixel and the second sub-pixel may be located on one of a common horizontal axis with integer pixel positions within the block, and a common vertical axis with integer pixel positions within the block.

In still other examples, one of the following conditions may be met: (1) one of the filter support positions of the first set of filter support positions corresponds to a sub-pixel position within the block corresponding to the second sub-pixel value, and (2) one of the filter support positions of the second set of filter support positions corresponds to a sub-pixel position within the block corresponding to the first sub-pixel value.

In some examples, video encoder 20 may be further configured to encode one or more signaling bits that identify one or more of a number of the filter coefficients included within each of the first and second one-dimensional arrays, and a value of each of the filter coefficients.

Additionally, to compute the sub-pixel values corresponding to the sub-pixel positions associated with the block, video encoder 20 may be further configured to compute a third sub-pixel value by applying a third interpolation filter defining a two-dimensional array of filter coefficients corresponding to a two-dimensional set of filter support positions within the block. One of a horizontal dimension and a vertical dimension of the two-dimensional array of filter coefficients may be selected to comprise more filter coefficients than another one of the horizontal dimension and the vertical dimension of the two-dimensional array based on the scanning order associated with the block. In this example, the one of the horizontal dimension and the vertical dimension selected to comprise more filter coefficients can be parallel relative to the scanning order.

In one example, the one of the horizontal dimension and the vertical dimension of the two-dimensional array of filter coefficients may comprise 8 coefficients, and the other one of the horizontal dimension and the vertical dimension of the two-dimensional array may comprise 6 coefficients. Similarly, in another example, the one of the horizontal dimension and the vertical dimension of the two-dimensional array of filter coefficients may comprise 8 coefficients, and the other one of the horizontal dimension and the vertical dimension of the two-dimensional array may comprise 7 coefficients.

In some examples, video encoder 20 may be further configured to encode one or more signaling bits that identify one or more of a number of the filter coefficients included within the two-dimensional array, and a value of each of the filter coefficients.

Finally, after generating the prediction block of pixels, or a "predictive block," using the low complexity interpolation filters with adaptive tap size in the manner described above, video encoder 20 may encode a block of video data using the predictive block. For example, video encoder 20 may be further configured to receive a block of pixels to be encoded, subtract the prediction block from the block of pixels to be encoded to generate a residual block of pixels, and encode the residual block.

Inverse quantization unit 58 and inverse transform module 60 apply inverse quantization and inverse transformation, respectively, to reconstruct the residual block in the pixel domain, e.g., for later use as a reference block, consistent with the techniques of this disclosure. Motion compensation unit 44 may calculate the reference block by adding the reconstructed residual block to the motion compensated predictive block, and store the resultant reference block as one of the frames of memory 64. Motion estimation unit 42 and motion compensation unit 44 may subsequently use the reference block, e.g., by applying one or more interpolation filters to the reference block to calculate sub-integer pixel values, for motion estimation and motion compensation in the manner described above. For example, summer 62 adds the reconstructed residual block to the motion compensated predictive block produced by motion compensation unit 44 to produce the reconstructed video block, i.e., the reference block, for storage in memory 64. The reconstructed video block may be used by motion estimation unit 42 and motion compensation unit 44 as a reference block to inter-code a block in a subsequent video frame.

Accordingly, the techniques of this disclosure may enable video encoder 20 to use low complexity interpolation filters with adaptive tap size when generating predictive data for one or more blocks of video data used to encode the blocks. In this manner, there may be a relative reduction in complexity and the number of memory accesses for video encoder 20 when using the techniques of this disclosure.

In this manner, video encoder 20 represents an example of a video coder configured to obtain a block of pixels comprising integer pixel values corresponding to integer pixel positions within the block, and compute sub-pixel values corresponding to sub-pixel positions associated with the block. To compute the sub-pixel values, the video coder is configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. The first one-dimensional array can be selected to comprise more filter coefficients than the second one-dimensional array based on a scanning order associated with the block. The video encoder is further configured to generate a prediction block of pixels based on one or more of the computed sub-pixel values.

Figure 3:
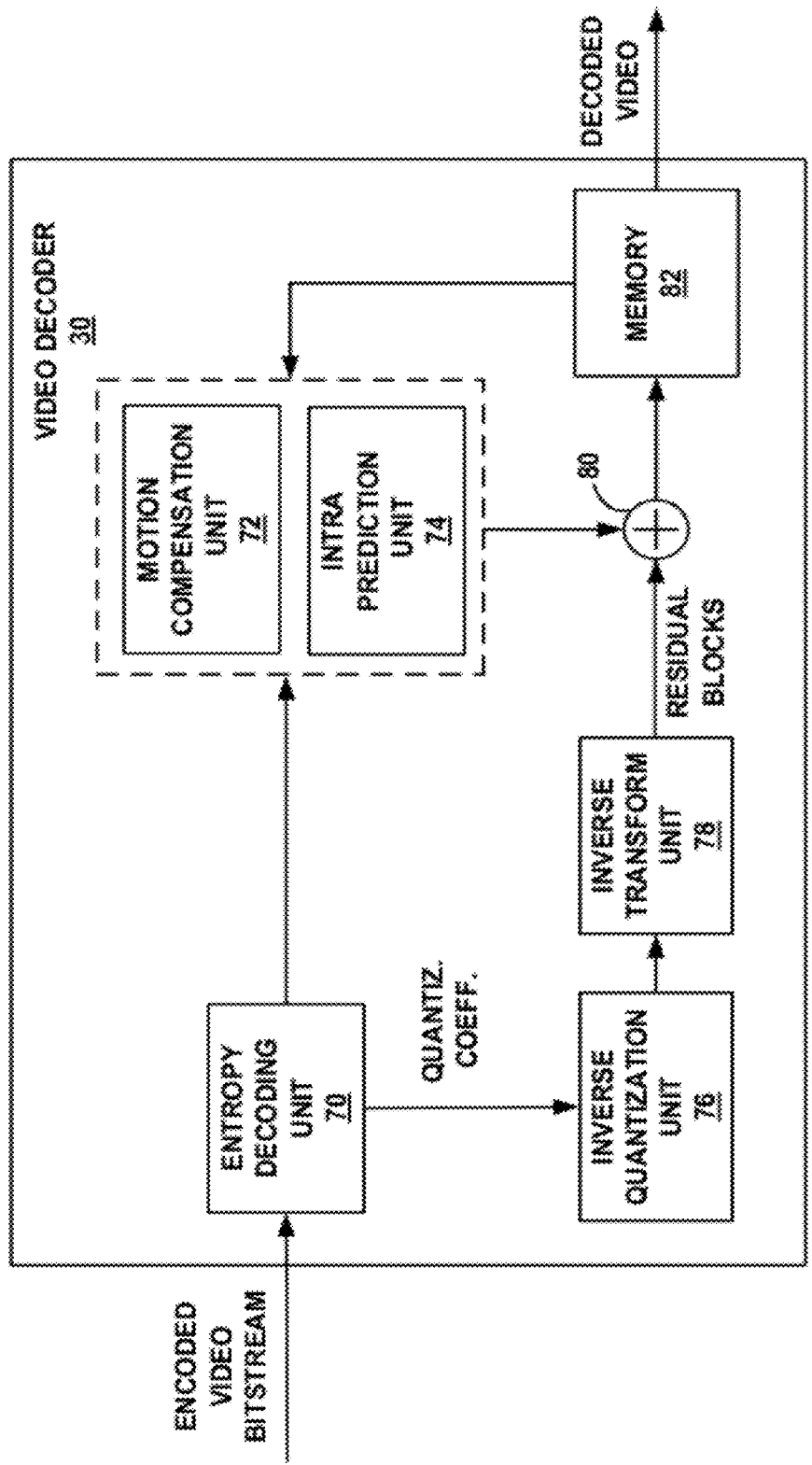
FIG. 3 is a block diagram that illustrates an example of a video decoder that may implement techniques for decoding blocks of video data using low complexity interpolation filters with adaptive tap size, consistent with the techniques of this disclosure.

FIG. 3 is a block diagram that illustrates an example of a video decoder 30 that may implement techniques for decoding blocks of video data using low complexity interpolation filters with adaptive tap size, consistent with the techniques of this disclosure. In the example of FIG. 3, video decoder 30 includes an entropy decoding unit 70, motion compensation unit 72, intra-prediction module 74, inverse quantization unit 76, inverse transform module 78, memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70.

Motion compensation unit 72 may use motion vectors received in the bitstream to identify a prediction, or "predictive" block in reference frames in memory 82. Intra-prediction module 74 may use intra-prediction modes received in the bitstream to form a prediction block from spatially adjacent blocks.

Intra-prediction module 74 may use an indication of an intra-prediction mode for the encoded block to intra-predict the encoded block, e.g., using pixels of neighboring, previously decoded blocks. For examples in which the block is inter-prediction mode encoded, motion compensation unit 72 may receive information defining a motion vector, in order to retrieve motion compensated prediction, or "predictive" data for the encoded block. In any case, motion compensation unit 72 or intra-prediction module 74 may provide information defining a prediction block to summer 80.

Inverse quantization unit 76 inverse quantizes, i.e., de-quantizes, the quantized block coefficients provided in the bitstream and decoded by entropy decoding unit 70. The inverse quantization process may include a conventional process, e.g., as defined by the H.264 decoding standard or as performed by the HEVC Test Model. The inverse quantization process may also include use of a quantization parameter $QP_Y$ calculated by video encoder 20 for each block to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain. Motion compensation unit 72 produces motion compensated blocks, possibly performing interpolation based on interpolation filters, consistent with the techniques of this disclosure. Identifiers, e.g., one or more signaling bits, for interpolation filters to be used for motion estimation with sub-pixel precision may be included in the syntax elements, in some examples. In other examples, the interpolation filters may have static properties available to both video encoder 20 and video decoder 30. Motion compensation unit 72 may use interpolation filters as used by video encoder 20 during encoding of the video block to calculate interpolated values for sub-integer pixels of a reference block, as previously described. Once again, in some examples, motion compensation unit 72 may determine the interpolation filters used by video encoder 20 according to received syntax information and use the interpolation filters to produce predictive blocks.

Motion compensation unit 72 uses some of the syntax information for the encoded block to determine sizes of blocks used to encode frame(s) of the encoded video sequence, partition information that describes how each block of a frame or slice of the encoded video sequence is partitioned, modes indicating how each partition is encoded, one or more reference frames (and reference frame lists) for each inter-encoded block or partition, and other information to decode the encoded video sequence. Intra-prediction module 74 may also use the syntax information for the encoded block to intra-predict the encoded block, e.g., using pixels of neighboring, previously decoded blocks, as described above.

Summer 80 sums the residual blocks with the corresponding prediction blocks generated by motion compensation unit 72 or intra-prediction module 74 to form decoded blocks. If desired, a deblocking filter may also be applied to filter the decoded blocks in order to remove blockiness artifacts. The decoded video blocks are then stored in memory 82, which provides reference blocks for subsequent motion compensation and also produces decoded video for presentation on a display device (such as display device 32 of FIG. 1).

In some examples, video decoder 30 may be configured to decode certain blocks of video data (e.g., one or more macroblocks, or TUs of a CU). For example, video decoder 30 may be configured to decode a particular block of video data by generating a predictive block for the block being decoded using a reference block of video data. In accordance with the techniques of this disclosure, as one example, video decoder 30 may be configured to obtain a block of pixels comprising integer pixel values corresponding to integer pixel positions within the block, and compute sub-pixel values corresponding to sub-pixel positions associated with the block. For example, to compute the sub-pixel values, video decoder 30 may be configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. In this example, the first one-dimensional array may be selected to comprise more filter coefficients than the second one-dimensional array based on a scanning order associated with the block. Video decoder 30 may be further configured to generate a prediction block of pixels based on one or more of the computed sub-pixel values. In this example, the first set of filter support positions can include filter support positions arranged in parallel relative to a scanning order associated with the block, and the second set of filter support positions can include filter support positions arranged perpendicular relative to the scanning order.

In some examples, one of the first set of filter support positions and the second set of filter support positions may comprise a set of horizontal filter support positions arranged in a common row within the block, and another one of the first set of filter support positions and the second set of filter support positions may comprise a set of vertical filter support positions arranged in a common column within the block.

In one example, the first one-dimensional array of filter coefficients may comprise 8 coefficients, and the second one-dimensional array of filter coefficients may comprise 6 coefficients. Similarly, in another example, the first one-dimensional array of filter coefficients may comprise 8 coefficients, and the second one-dimensional array of filter coefficients may comprise 7 coefficients.

In other examples, at least one of the first set of filter support positions and the second set of filter support positions may correspond to a set of integer pixel positions within the block.

In still other examples, at least one of the first sub-pixel and the second sub-pixel may be located on one of a common horizontal axis with integer pixel positions within the block, and a common vertical axis with integer pixel positions within the block.

In still other examples, one of the following conditions may be met: (1) one of the filter support positions of the first set of filter support positions corresponds to a sub-pixel position within the block corresponding to the second sub-pixel value, and (2) one of the filter support positions of the second set of filter support positions corresponds to a sub-pixel position within the block corresponding to the first sub-pixel value.

In some examples, video decoder 30 may be further configured to decode one or more signaling bits that identify one or more of a number of the filter coefficients included within each of the first and second one-dimensional arrays, and a value of each of the filter coefficients.

Additionally, to compute the sub-pixel values corresponding to the sub-pixel positions associated with the block, video decoder 30 may be further configured to compute a third sub-pixel value by applying a third interpolation filter defining a two-dimensional array of filter coefficients corresponding to a two-dimensional set of filter support positions within the block. One of a horizontal dimension and a vertical dimension of the two-dimensional array of filter coefficients may be selected to comprise more filter coefficients than another one of the horizontal dimension and the vertical dimension of the two-dimensional array based on the scanning order associated with the block. In this example, the one of the horizontal dimension and the vertical dimension selected to comprise more filter coefficients can be parallel relative to the scanning order.

In one example, the one of the horizontal dimension and the vertical dimension of the two-dimensional array of filter coefficients may comprise 8 coefficients, and the other one of the horizontal dimension and the vertical dimension of the two-dimensional array may comprise 6 coefficients. Similarly, in another example, the one of the horizontal dimension and the vertical dimension of the two-dimensional array of filter coefficients may comprise 8 coefficients, and the other one of the horizontal dimension and the vertical dimension of the two-dimensional array may comprise 7 coefficients.

In some examples, video decoder 30 may be further configured to decode one or more signaling bits that identify one or more of a number of the filter coefficients included within the two-dimensional array, and a value of each of the filter coefficients.

Finally, after generating the prediction block of pixels, or a "predictive block," using the low complexity interpolation filters with adaptive tap size in the manner described above, video decoder 30 may decode a block of video data using the predictive block. For example, video decoder 30 may be further configured to receive an encoded residual block of pixels, decode the residual block, and add the decoded residual block to the prediction block to generate a decoded block of pixels.

In this manner, video decoder 30 represents an example of a video coder configured to obtain a block of pixels comprising integer pixel values corresponding to integer pixel positions within the block, and compute sub-pixel values corresponding to sub-pixel positions associated with the block. To compute the sub-pixel values, the video coder is configured to compute a first sub-pixel value by applying a first interpolation filter defining a first one-dimensional array of filter coefficients corresponding to a first set of filter support positions within the block, and compute a second sub-pixel value by applying a second interpolation filter defining a second one-dimensional array of filter coefficients corresponding to a second set of filter support positions within the block. The first one-dimensional array can be selected to comprise more filter coefficients than the second one-dimensional array based on a scanning order associated with the block. The video coder is further configured to generate a prediction block of pixels based on one or more of the computed sub-pixel values.

Figure 4:
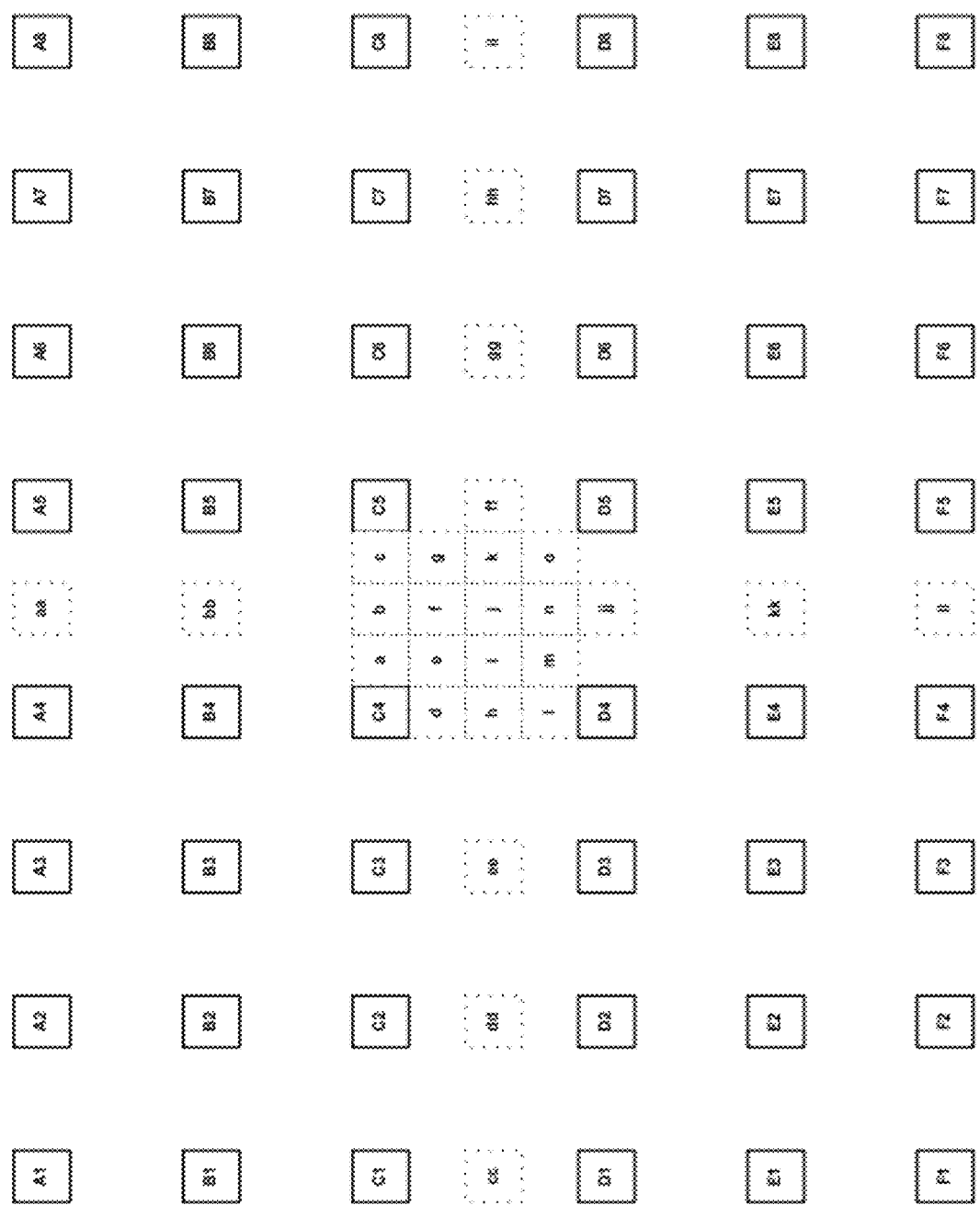
FIG. 4 is a conceptual diagram that illustrates reference integer pixels associated with reference data, and predictive sub-pixels associated with interpolated predictive data, for a block of video data.

FIG. 4 is a conceptual diagram that illustrates reference integer pixels associated with reference data, and predictive sub-pixels associated with interpolated predictive data, for a block of video data. In the example of FIG. 4, boxes with solid borders represent reference integer pixel positions, and boxes with dashed borders represent predictive sub-pixel positions, within a reference block of video data. Capitalized letters (in the boxes with solid borders) indicate reference integer pixels, while lower-case letters (in the boxes with dashed borders) indicate predictive sub-pixels. In particular, pixels A1-A8, B1-B8, C1-C8, D1-D8, E1-E8, and F1-F8 represent an 8×6 (i.e., 8 pixels the horizontal and 6 pixels in the vertical direction) array of integer pixels within a reference block of a reference frame, slice, or another coded unit. Sub-pixels "a" through "o" represent fifteen sub-pixels associated with integer pixel C4 (i.e. the fifteen sub-pixels located between integer pixels C4, C5, D4 and D5). Similar sub-pixels may exist for other integer pixel location of FIG. 4 in a substantially similar manner as described above but are not shown for simplicity. In the example of FIG. 4, sub-pixels "a" through "o" represent every half-pel and quarter-pel pixel associated with integer pixel C4. Sub-pixels "aa" through "ll" also depicted in FIG. 4 will be discussed in detail below.

Generally speaking, each integer pixel may be associated with a physical sensor element, such as a photodiode, that was used to generate the associated video data. The photodiode may measure an intensity of a light source at a location of the sensor that corresponds to the position of the integer pixel, and associate a pixel intensity value, e.g., a pixel value, with the integer pixel. Again, each integer pixel may have an associated set of fifteen (or possibly more) sub-pixels. The number of sub-pixels associated with a particular integer pixel may be dependent upon the desired precision used to generate the predictive data. In the example of FIG. 4, the desired precision is quarter-pixel, or quarter-pel precision, in which case, each of the integer pixels corresponds to fifteen sub-pixels. More or fewer sub-pixels may be associated with each integer pixels depending on the desired precision, as previously described. As one example, for half-pixel, or half-pel precision, each integer pixel may correspond to three sub-pixels. For example, integer pixel C4 may correspond to sub-pixels "b," "h," and "j." As another example, for eighth-pixel, or eighth-pel precision, each integer pixel may correspond to sixty-three sub-pixels (not shown).

Furthermore, each integer pixel and sub-pixel may be associated with one or more pixel values, e.g., one or more luminance and chrominance values. For example, as previously described, a Y component of a block of video data may represent luminance data, and Cb and Cr components of the block may each represent chrominance data, within a three-dimensional YCbCr color space. Accordingly, each integer pixel and sub-pixel may be associated with three pixel values, e.g., Y, Cb, and Cr values, for the three-dimensional color space. The techniques of this disclosure, however, may refer to generating predictive data with respect to a single component, or "dimension," of a particular block of video data, for purposes of simplicity. To the extent that the techniques are described with respect to pixel values of one component or dimension, similar techniques may be extended to the other components or dimensions. In some cases, chrominance data for a block of video data may be sub-sampled relative to the luminance data for the block. However, the interpolation filtering techniques descried herein may apply equally to luminance and chrominance data of a block of video data, irrespective of how the respective data are sampled.

In the example of FIG. 4, sub-pixels "a" through "o" associated with integer pixel C4 are illustrated for the case of quarter-pixel precision. The fifteen sub-pixels associated with integer pixel C4 are labeled as "a," "b," "c," "d," "e," "f," "g," "h," "i," "j," "k," "l," "m," "n," and "o," as previously described. Most of the other fractional locations associated with other integer pixels are not shown for simplicity. Sub-pixels "b," "h" and "j" may be referred to as half-pixels and sub-pixels "a," "c," "d," "e," "f," "g," "i," "k," "l," "m," and "o" may be referred to as quarter-pixels. Furthermore, in this disclosure, sub-pixels oriented along a same horizontal axis as integer pixels can be referred to as horizontal sub-pixels. Sub-pixels "a," "b," and "c" are examples of horizontal sub-pixels. Sub-pixels oriented on a same vertical axis as integer pixels can be referred to as vertical sub-pixels. Sub-pixels "d," "h," and "l" are examples of vertical sub-pixels. Aspects of this disclosure include determining pixel values for horizontal sub-pixels and vertical sub-pixels using low complexity interpolation filters with adaptive tap size, and thus this disclosure may refer to horizontal sub-pixels and vertical sub-pixels collectively as 1L sub-pixels. In this disclosure, the term "1L" indicates that each pixel value of the horizontal and vertical sub-pixels is determined using a single low complexity linear interpolation filter with adaptive tap size.

Similarly, in this disclosure, all other sub-pixels associated with a particular integer pixel can be referred to 2L sub-pixels. Sub-pixels "e," "f," "g," "i," "j," "k," "m," "n," and "o" are examples of 2L sub-pixels. Aspects of this disclosure include determining pixel values for 2L sub-pixels also using the low complexity interpolation filters with adaptive tap size. For example, each pixel value of the 2L sub-pixels is determined using two separable low complexity linear interpolation filters with adaptive tap size, one applied in the vertical direction and one applied in the horizontal direction, or a two-dimensional low complexity linear interpolation filter with adaptive tap size.

Motion compensation unit 44 of video encoder 20 and/or motion compensation unit 72 of video decoder 30 may determine pixel values for sub-pixels "a" through "o" using the interpolation filtering techniques of this disclosure. For half-pixels "b" and "h," each filter coefficient, also called a tap, may correspond to an integer pixel located in the horizontal and vertical direction, respectively. In particular, for half-pixel "b," the taps of the 8-tap filter correspond to integer pixels C1-C8. Likewise, for half-pixel "h," the taps of the 6-tap filter correspond to integer pixels A4, B4, C4, D4, E4, and F4. For example, pixel values for sub-pixels "b" and "h" may be computed using equations (1) and (2):

$$b=((-3*C1+12*C2-39*C3+158*C4+158*C5-39*C6+12*C7-3*C8)+128)/256 \quad (1)$$

$$h=((12*A4-39*B4+158*C4+158*D4-39*E4+12*F4)+128)/256 \quad (2)$$

In some implementations, the division by 256 can be implemented by a right shift of 8 bits. As with sub-pixel "b," for quarter-pixels "a" and "c," the taps of the 8-tap filter may correspond to C1-C8, but unlike sub-pixel "b," the filter coefficients might be non-symmetric and different than for sub-pixel "b," as previously described. For example, pixel values for sub-pixels "a" and "c" may be computed using equations (3) and (4):

$$a=((-3*C1+12*C2-37*C3+229*C4+71*C5-21*C6+6*C7-C8)+128)/256 \quad (3)$$

$$c=((-C1+6*C2-21*C3+71*C4+229*C5-37*C6+12*C7-3*C8)+128)/256 \quad (4)$$

In some implementations, the division by 256 can be implemented by a right shift of 8 bits. As with sub-pixel "h," for quarter-pixels "d" and "l," the taps of the 6-tap filter may correspond to A4, B4, C4, D4, E4, and F4, but unlike sub-pixel "h," the filter coefficients might be non-symmetric and different than for sub-pixel "h." For example, pixel values for sub-pixels "d" and "l" may be computed using equations (5) and (6):

$$d=((12*A4-37*B4+229*C4+71*D4-21*E4+6*F4)+128)/256 \quad (5)$$

$$l=((6*A4-21*B4+71*C4+229*D4-37*E4+12*F4)+128)/256 \quad (6)$$

In some implementations, the division by 256 can be implemented by a right shift of 8 bits. Although the example coefficients given for equations (1)-(6) above generally use the same coefficients for both horizontal sub-pixels and vertical sub-pixels, it is not required that the coefficients for horizontal and vertical sub-pixels be the same. For example, equations (1) and (2), (3) and (5), and (4) and (6), respectively have the same coefficients in the examples above, but in some implementations, each may have different coefficients.

Motion compensation unit 44 and motion compensation unit 72 may also determine pixel values for 2L sub-pixels "e," "f," "g," "i," "j," "k," "m," "n," and "o," using the interpolation filtering techniques of this disclosure. For the 2L sub-pixels, a horizontal filtering is followed by a vertical filtering, or vice versa. The first filtering operation determines intermediate sub-pixel values, and the second filtering operation utilizes the intermediate sub-pixel values to determine a pixel value for the interpolated sub-pixel. For example, to determine a value for sub-pixel "j," six 8-tap horizontal filters can be used to determine intermediate values for sub-pixels "aa," "bb," "b," "jj," "kk," and "ll," using the following equations:

$$aa=((A1+8*A2-40*A3+160*A4+160*A5-40*A6+8*A7+A8)+128)/256 \quad (7)$$

$$bb=((B1+8*B2-40*B3+160*B4+160*B5-40*B6+8*B7+B8)+128)/256 \quad (8)$$

$$b=((C1+8*C2-40*C3+160*C4+160*C5-40*C6+8*C7+C8)+128)/256 \quad (9)$$

$$jj=((D1+8*D2-40*D3+160*D4+160*D5-40*D6+8*D7+D8)+128)/256 \quad (10)$$

$$kk=((E1+8*E2-40*E3+160*E4+160*E5-40*E6+8*E7+E8)+128)/256 \quad (11)$$

$$ll=((F1+8*F2-40*F3+160*F4+160*F5-40*F6+8*F7+F8)+128)/256 \quad (12)$$

In some implementations, the division by 256 can be implemented by a right shift of 8 bits. Applying a 6-tap vertical filter to the intermediate values above, the value for sub-pixel "j" can be determined using the following equation:

$$j=((8*aa-40*bb+160*b+160*jj-40*kk+8*ll)+128)/256 \quad (13)$$

In some implementations, the division by 256 can be implemented by a right shift of 8 bits. Alternatively, eight 6-tap vertical filters can be used to find intermediate values for sub-pixels "cc," "dd," "ee," "h," "ff," "gg," "hh," and "ll," and an 8-tap horizontal filter can be applied to those intermediate values to determine a pixel value for sub-pixel "j."

Similar to the procedure described above for sub-pixel "j," pixel values for sub-pixels "e," "f," "g," "i," "k," "m," "n," and "o" can be determined by first performing an six 8-tap horizontal filtering operations to determine intermediate values of sub-pixels, and then applying a 6-tap vertical filter to the intermediate values determined by the horizontal filtering, or by first performing eight 6-tap vertical filtering operations to determine intermediate values of sub-pixels, and then applying an 8-tap horizontal filter to the intermediate values determined by the vertical filtering. While both the horizontal and vertical filters used as examples above for sub-pixel "j" use symmetrical coefficients, one or both of the horizontal or vertical filters used to determine pixel values for the other 2D sub-pixels may not be symmetrical. As one example, both the horizontal and vertical filters for sub-pixels "e," "g," "m," and "o" might use non-symmetrical coefficients. Sub-pixels "f" and "n" may use a horizontal filter with symmetrical coefficients and a vertical filter with non-symmetrical coefficients, and sub-pixels "i" and "k" may use a horizontal filter with non-symmetrical coefficients and a vertical filter with symmetrical filter coefficients.

Referring back to FIGS. 2 and 3, the actual filters applied by motion compensation unit 42 and/or motion compensation unit 72 to generate interpolated data at the sub-pixel positions may be subject to a wide variety of implementations. As one example, video encoder 20 may transmit various filter parameters in the bitstream to video decoder 30 that define the exact properties of the filters used by video encoder 20 to video decoder 30. As another example, both video encoder 20 and video decoder 30 may utilize switched filtering, wherein multiple filters are known by both video encoder 20 and video decoder 30, and the indication of the particular filter to be used is signaled from video encoder 20 to video decoder 30 in the bitstream. As still another example, both video encoder 20 and video decoder 30 may utilize a fixed number of filters known by both video encoder 20 and video decoder 30, and independently select the appropriate filter to be used based on syntax information, or properties of the respective one of video encoder 20 and video decoder 30. In any case, video encoder 20 and/or video decoder 30 may select the appropriate filter to be used, i.e., a filter of appropriate length, in a manner consistent with the techniques of this disclosure.

Motion compensation unit 44 and/or motion compensation unit 72 may use separable interpolation filters in the horizontal direction and in the vertical direction. For the 1L sub-pixels, motion compensation unit 44 and/or motion compensation unit 72 may apply only horizontal directional filters or only vertical directional filters depending on the position of the sub-pixel. In one example, the horizontal directional filters comprise 8-position (or 8-tap) filters, and the vertical directional filters comprise 6-position (or 6-tap) filters. Motion compensation unit 44 and/or motion compensation unit 72 may apply horizontal directional filters for sub-pixels "a," "b," and "c" using integer pixels C1-C8 as filter support positions, and apply vertical directional filters for sub-pixels "d," "h," and "l" using integer pixels A4, B4, C4, D4, E4, and F4 as filter support positions. For the remaining sub-pixels, i.e., the 2L sub-pixels, motion compensation unit 44 and/or motion compensation unit 72 may apply horizontal filtering first, followed by vertical filtering, or vertical filtering first, followed by horizontal filtering. Each of the horizontal filters used for the 2L sub-pixels might be an 8-tap filter, and each of the vertical filters used for the 2L sub-pixels might be a 6-tap filter.

Additionally, motion compensation unit 44 and/or motion compensation unit 72 may use a single two-dimensional "non-separable" interpolation filter to determine the pixel values of the 2L sub-pixels. In this case, the horizontal dimension of the filter may comprise 8 filter coefficients, and the vertical dimension of the filter may comprise 6 filter coefficients.

Although this disclosure describes 8-tap filters and 6-tap filters, and 8- and 6-coefficient filter dimensions, as examples, it should be noted that other filter lengths and dimensions can also be used and are within the scope of this disclosure. For example, 8-tap filters may be used for determining pixel values for the 1L and 2L sub-pixels using horizontal filter support positions, while 7-tap filters may be used for determining pixel values for the 1L and 2L sub-pixels using vertical filter support positions, or vice versa, wherein the filters having the longer length correspond to the filter support positions arranged in parallel relative to the scanning order associated with the block.

Furthermore, two-dimensional filters with a horizontal dimension comprising 8 filter coefficients may be used for determining pixel values for the 2L sub-pixels using horizontal filter support positions, while filters with a vertical dimension comprising 7 filter coefficients may be used for determining pixel values for the 2L sub-pixels using vertical filter support positions, or vice versa, wherein the dimensions of the filters having the longer lengths, or, in other words, the dimensions of the filters that include the most filter coefficients, correspond to the filter support positions arranged in parallel relative to the scanning order associated with the block. Similarly, the filters having the shorter lengths, and the dimensions of the filters having the shorter lengths, correspond to the filter support positions arranged perpendicular relative to the scanning order. Alternatively, in other examples, 6-tap filters, or 6 coefficient filter dimensions, may be used for determining values for the 1L and/or 2L sub-pixels using horizontal filter support positions, while 4-tap filters, and 4 coefficient filter dimensions, may be used for determining values for the 1L and/or 2L sub-pixels using vertical filter support positions, or vice versa, in the same manner.

Figure 5:
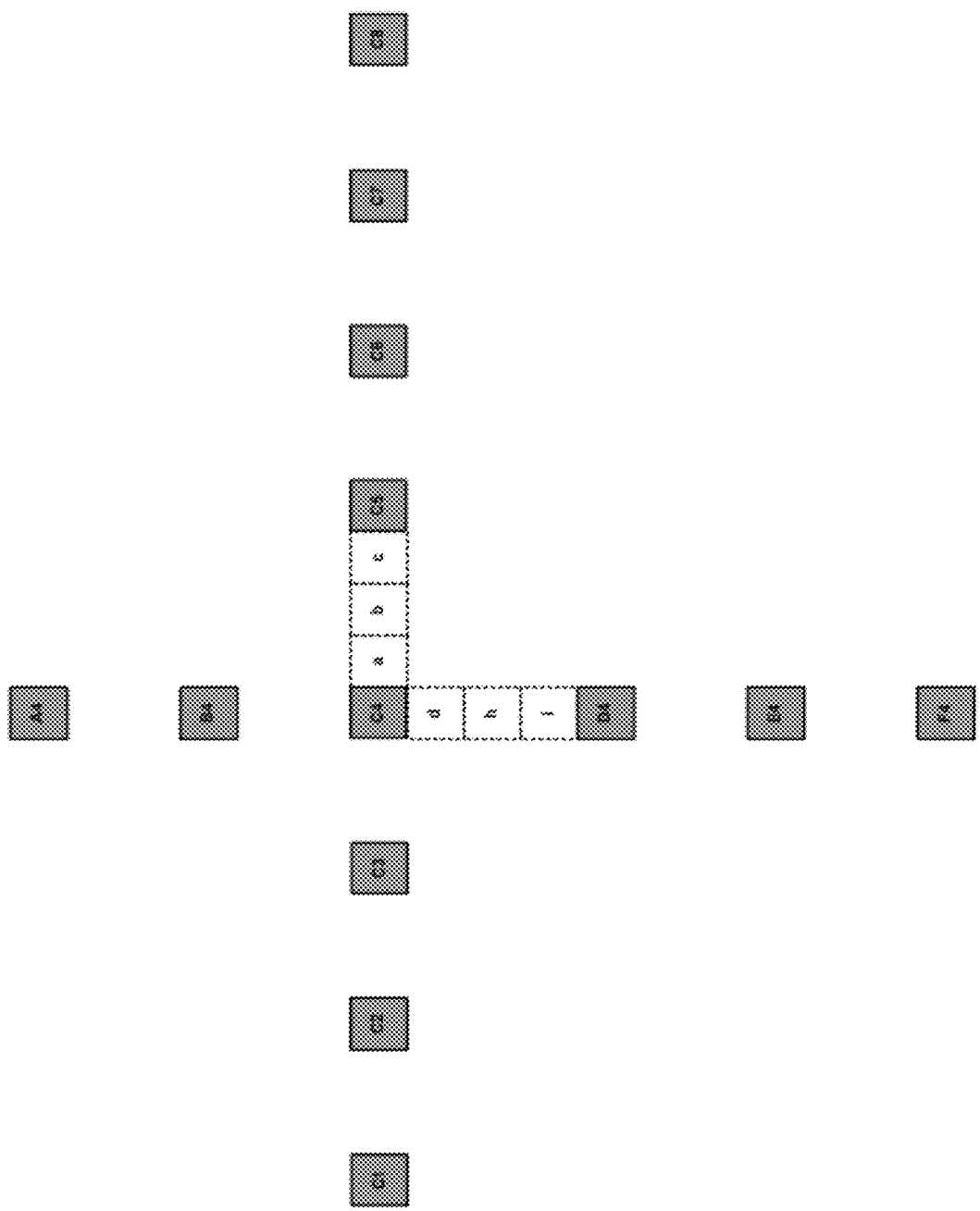
FIG. 5 is a conceptual diagram that illustrates reference integer pixels associated with reference data, and horizontal and vertical "1L" predictive sub-pixels associated with interpolated predictive data, for a block of video data.

FIG. 5 is a conceptual diagram that illustrates reference integer pixels associated with reference data, and horizontal and vertical "1L" predictive sub-pixels associated with interpolated predictive data, for a block of video data. As previously described with reference to FIG. 4, sub-pixels "a," "b," "c," "d," "h," and "i" may be referred to as 1L sub-pixels. Additionally, sub-pixels "a," "b," and "c" may be referred to as horizontal 1L sub-pixels, and sub-pixels "d," "h," and "l" may be referred to as vertical 1L sub-pixels.

Figure 6:
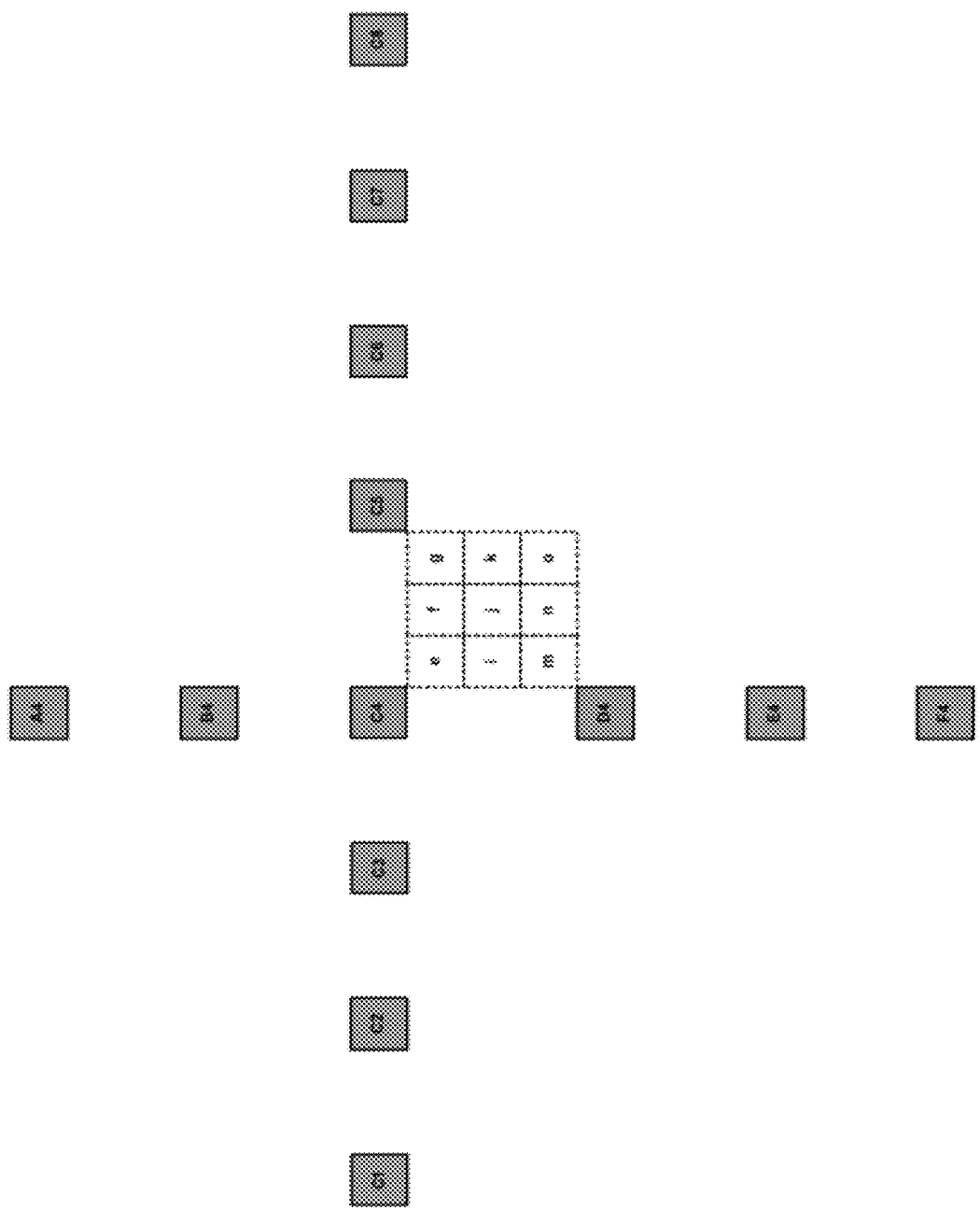
FIG. 6 is a conceptual diagram that illustrates reference integer pixels associated with reference data, and non-horizontal and non-vertical "2L" predictive sub-pixels associated with interpolated predictive data, for a block of video data.

FIG. 6 is a conceptual diagram that illustrates reference integer pixels associated with reference data, and non-horizontal and non-vertical "2L" predictive sub-pixels associated with interpolated predictive data, for a block of video data. As previously described with reference to FIG. 4, sub-pixels "e," "f," "g," "i," "j," "k," "m," "n," and "o" may be referred to as 2L sub-pixels.

FIG. 7 is a conceptual diagram that illustrates an 8-tap interpolation filter with coefficient symmetry. FIG. 7 shows eight horizontal filter support positions (integer pixels C1-C8) relative to a sub-pixel position (sub-pixel "b"). In FIG. 7, shading of integer pixels indicates symmetry among the corresponding coefficients and coefficients corresponding to other, non-shaded integer pixels. In particular, shading of the integer pixels to the left of sub-pixel "b" indicates that the corresponding coefficients are symmetrical relative to coefficients corresponding to the non-shaded integer pixels to the right of sub-pixel "b." In the example of FIG. 7, coefficient symmetry means that only four filter coefficients, corresponding to integer pixels C1-C4, are needed in order to define an entire set of filter coefficients for an interpolation filter used to interpolate sub-pixel "b," using integer pixels C1-C8 as filter support positions. For example, the coefficient corresponding to integer pixel C1 is symmetric relative to the coefficients corresponding to integer pixel C8, the coefficient corresponding to integer pixel C2 is symmetric relative to the coefficient corresponding to integer pixel C7, the coefficient corresponding to integer pixel C3 is symmetric relative to the coefficient corresponding to integer pixel C6, and the coefficient corresponding to integer pixel C4 is symmetric relative to the coefficient corresponding to integer pixel C5. Thus, only four coefficients need to be signaled by video encoder 20 to video decoder 30 as part of an encoded video bitstream, or stored local to video encoder 20 and video decoder 30, in order to define the entire set of eight filter coefficients needed to interpolate sub-pixel "b." The remaining coefficients can be generated at video decoder 30 (and in some cases at video encoder 20) based on the communicated or stored coefficients. In particular, video encoder 20 and/or video decoder 30 can be programmed to detect that coefficient symmetry is present, and generate any remaining coefficients based on the communicated or stored coefficients.

FIG. 8 is a conceptual diagram that illustrates an 8-tap interpolation filter without coefficient symmetry. FIG. 8 shows eight horizontal filter support positions (integer pixels C1-C8) relative to a sub-pixel position (sub-pixel "a"). Due to the lack of coefficient symmetry, eight filter coefficients, corresponding to integer pixels C1-C8, need to be communicated in order to define an entire set of filter coefficients for an interpolation filter used to interpolate sub-pixel "a," using integer pixels C1-C8 as filter support positions. However, coefficient symmetry may still apply in that the same filter coefficients derived for interpolating sub-pixel "a" can be used to interpolate sub-pixel "c" (as shown in FIGS. 4 and 5). For example, the eight filter coefficients used to interpolate sub-pixel "a," corresponding to integer pixels C1-C8, can be used to interpolate sub-pixel "c" by "flipping" the coefficients, such that the coefficient corresponding integer pixel C1 when interpolating sub-pixel "a" can be the coefficient corresponding to integer pixel C8 when interpolating sub-pixel "c," the coefficient corresponding integer pixel C2 when interpolating sub-pixel "a" can be the coefficient corresponding to integer pixel C7 when interpolating sub-pixel "c," the coefficient corresponding integer pixel C3 when interpolating sub-pixel "a" can be the coefficient corresponding to integer pixel C6 when interpolating sub-pixel "c," and the coefficient corresponding integer pixel C4 when interpolating sub-pixel "a" can be the coefficient corresponding to integer pixel C5 when interpolating sub-pixel "c." Thus, once again, only eight coefficients need to be communicated by video encoder 20 to video decoder 30 as part of an encoded video bitstream, or stored local to video encoder 20 and video decoder 30, in order to define the entire set of eight filter coefficients needed to interpolate each of sub-pixel "a" and sub-pixel "c." The remaining coefficients can be generated at video decoder 30 (and in some cases at video encoder 20) based on the communicated or stored coefficients. In particular, video encoder 20 and/or video decoder 30 can be programmed to detect that coefficient symmetry is present, and generate any remaining coefficients based on the communicated or stored coefficients, e.g., by flipping the coefficients as described.

The examples of FIGS. 7 and 8 illustrate examples of horizontal interpolation filters. The interpolation filters of FIGS. 7 and 8 each include eight filter coefficients corresponding to eight horizontal filter support positions (integer pixels C1-C8) within a reference block of video data (e.g., the reference block depicted in FIG. 4) relative to a sub-pixel position (i.e., sub-pixel "b" or "a").

FIG. 9 is a conceptual diagram that illustrates a 6-tap interpolation filter with coefficient symmetry. FIG. 9 shows six vertical filter support positions (integer pixels A4, B4, C4, D4, E4, and F4) relative to a sub-pixel position (sub-pixel "h"). Once again, in the example of FIG. 9, coefficient symmetry means that only three filter coefficients, corresponding to integer pixels A4, B4, and C4 are needed in order to define an entire set of filter coefficients for an interpolation filter used to interpolate sub-pixel "h," using integer pixels A4, B4, C4, D4, E4, and F4 as filter support positions. For example, the coefficient corresponding to integer pixel A4 is symmetric relative to the coefficients corresponding to integer pixel F4, the coefficient corresponding to integer pixel B4 is symmetric relative to the coefficient corresponding to integer pixel E4, and the coefficient corresponding to integer pixel C4 is symmetric relative to the coefficient corresponding to integer pixel D4. Thus, only three coefficients need to be communicated by video encoder 20 to video decoder 30 as part of an encoded video bitstream, or stored local to video encoder 20 and video decoder 30, in order to define the entire set of six filter coefficients needed to interpolate sub-pixel "h." The remaining coefficients can be generated at video decoder 30 (and in some cases at video encoder 20) based on the communicated or stored coefficients. In particular, video encoder 20 and/or video decoder 30 can be programmed to detect that coefficient symmetry is present, and generate any remaining coefficients based on the communicated or stored coefficients.

FIG. 10 is a conceptual diagram that illustrates a 6-tap interpolation filter without coefficient symmetry. FIG. 10 shows six vertical filter support positions (integer pixels A4, B4, C4, D4, E4, and F4) relative to a sub-pixel position (sub-pixel "d"). Once again, all six filter coefficients, corresponding to integer pixels A4, B4, C4, D4, E4, and F4 are needed in order to define an entire set of filter coefficients for an interpolation filter used to interpolate sub-pixel "d," using integer pixels A4, B4, C4, D4, E4, and F4 as filter support positions. However, coefficient symmetry may still apply in that the same filter coefficients derived for interpolating sub-pixel "d" can be used to interpolate sub-pixel "l" (as shown in FIGS. 4 and 5). For example, the six filter coefficients used to interpolate sub-pixel "d," corresponding to integer pixels A4, B4, C4, D4, E4, and F4 can be used to interpolate sub-pixel "l" by flipping the coefficients, such that the coefficient corresponding integer pixel A4 when interpolating sub-pixel "d" can be the coefficient corresponding to integer pixel F4 when interpolating sub-pixel "l," the coefficient corresponding integer pixel B4 when interpolating sub-pixel "d" can be the coefficient corresponding to integer pixel E4 when interpolating sub-pixel "l," and the coefficient corresponding integer pixel C4 when interpolating sub-pixel "d" can be the coefficient corresponding to integer pixel D4 when interpolating sub-pixel "l." Thus, once again, only six coefficients need to be communicated by video encoder 20 to video decoder 30 as part of an encoded video bitstream, or stored local to video encoder 20 and video decoder 30, in order to define the entire set of six filter coefficients needed to interpolate each of sub-pixel "d" and sub-pixel "l." The remaining coefficients can be generated at video decoder 30 (and in some cases at video encoder 20) based on the communicated or stored coefficients. In particular, video encoder 20 and/or video decoder 30 can be programmed to detect that coefficient symmetry is present, and generate any remaining coefficients based on the communicated or stored coefficients, e.g., by flipping the coefficients as described.

The examples of FIGS. 9 and 10 illustrate examples of vertical interpolation filters. The interpolation filters of FIGS. 9 and 10 each include six filter coefficients corresponding to six vertical filter support positions (integer pixels A4, B4, C4, D4, E4, and F4) within a reference block of video data (e.g., the reference block depicted in FIG. 4) relative to a sub-pixel position (i.e., sub-pixel "h" or "d").

Figure 11:
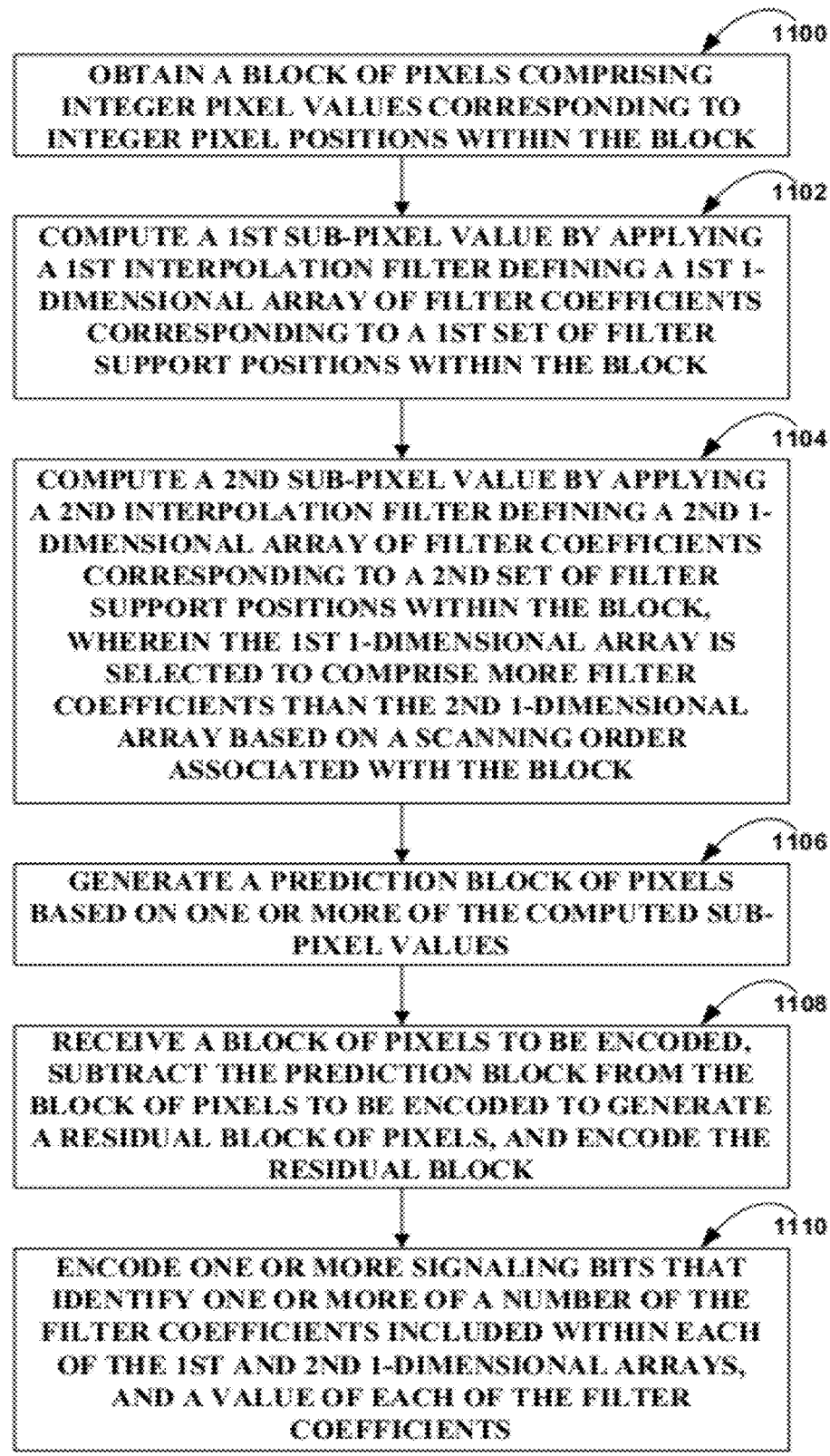
FIG. 11 is a flow diagram that illustrates an example of a method of encoding blocks of video data using low complexity interpolation filters with adaptive tap size, consistent with the techniques of this disclosure.

FIG. 11 is a flow diagram that illustrates an example of a method of encoding blocks of video data using low complexity interpolation filters with adaptive tap size, consistent with the techniques of this disclosure. The techniques of FIG. 11 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 11 are described with respect to video encoder 20 (FIGS. 1 and 2), although it should be understood that other devices may be configured to perform similar techniques. Moreover, the steps illustrated in FIG. 11 may be performed in a different order or in parallel, and additional steps may be added and certain steps omitted, without departing from the techniques of this disclosure.

Video encoder 20 may encode one or more blocks of video data. Initially, in some examples, video encoder 20 may obtain a block of pixels comprising integer pixel values corresponding to integer pixel positions within the block (1100). For example, the block may be a macroblock, or a TU of a CU, as previously described. As also previously described, the block of pixels may comprise a reference block of video data used to generate a predictive block for encoding a particular block of video data.

Video encoder 20 may further compute a first sub-pixel value by applying a first interpolation filter defining a first one-dimensional array of filter coefficients corresponding to a first set of filter support positions within the block (1102). Additionally, video encoder 20 may further compute a second sub-pixel value by applying a second interpolation filter defining a second one-dimensional array of filter coefficients corresponding to a second set of filter support positions within the block. The first one-dimensional array may be selected to comprise more filter coefficients than the second one-dimensional array based on a scanning order associated with the block (1104).

Video encoder 20 may further generate a prediction block of pixels based on one or more of the computed sub-pixel values (1106). For example, the prediction block of pixels may be referred to as a "predictive block," and may be used to encode the block of video data as described above.

In some examples, video encoder 20 may further receive a block of pixels to be encoded, subtract the prediction block from the block of pixels to be encoded to generate a residual block of pixels, and encode the residual block (1108). For example, the block of pixels to be encoded may also be a macroblock, or a TU of a CU, as also previously described.

Finally, in some examples, video encoder 20 may encode one or more signaling bits that identify one or more of a number of the filter coefficients included within each of the first and second one-dimensional arrays, and a value of each of the filter coefficients (1110).

In this manner, the method of FIG. 11 represents an example of a method of coding blocks of video data that includes obtaining a block of pixels comprising integer pixel values corresponding to integer pixel positions within the block, computing sub-pixel values corresponding to sub-pixel positions associated with the block, wherein computing the sub-pixel values includes computing a first sub-pixel value by applying a first interpolation filter defining a first one-dimensional array of filter coefficients corresponding to a first set of filter support positions within the block, and computing a second sub-pixel value by applying a second interpolation filter defining a second one-dimensional array of filter coefficients corresponding to a second set of filter support positions within the block, wherein the first one-dimensional array is selected to comprise more filter coefficients than the second one-dimensional array based on a scanning order associated with the block, and generating a prediction block of pixels based on one or more of the computed sub-pixel values.

Figure 12:
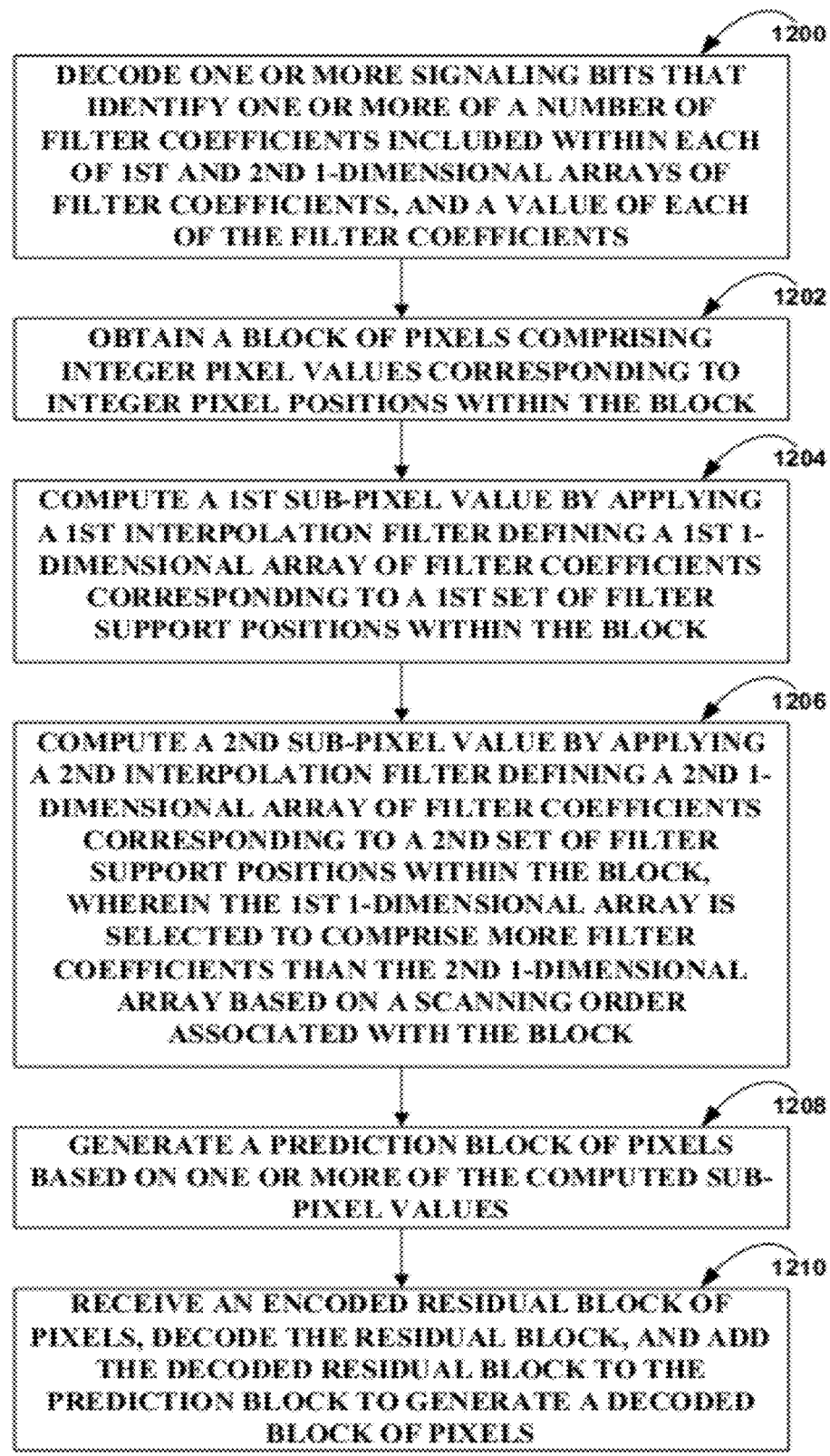
FIG. 12 is a flow diagram that illustrates an example of a method of decoding blocks of video data using low complexity interpolation filters with adaptive tap size, consistent with the techniques of this disclosure.

FIG. 12 is a flow diagram that illustrates an example of a method of decoding blocks of video data using low complexity interpolation filters with adaptive tap size, consistent with the techniques of this disclosure. The techniques of FIG. 12 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 12 are described with respect to video decoder 30 (FIGS. 1 and 3), although it should be understood that other devices may be configured to perform similar techniques. Moreover, the steps illustrated in FIG. 12 may be performed in a different order or in parallel, and additional steps may be added and certain steps omitted, without departing from the techniques of this disclosure.

Video decoder 30 may decode one or more blocks of video data. Initially, in some examples, video decoder 30 may decode one or more signaling bits that identify one or more of a number of filter coefficients included within each of first and second one-dimensional arrays of filter coefficients, and a value of each of the filter coefficients (1200).

Video decoder 30 may further obtain a block of pixels comprising integer pixel values corresponding to integer pixel positions within the block (1202). For example, the block may be a macroblock, or a TU of a CU, as previously described. As also previously described, the block of pixels may comprise a reference block of video data used to generate a predictive block for decoding a particular block of video data.

Video decoder 30 may further compute a first sub-pixel value by applying a first interpolation filter defining a first one-dimensional array of filter coefficients corresponding to a first set of filter support positions within the block (1204). Additionally, video decoder 30 may further compute a second sub-pixel value by applying a second interpolation filter defining a second one-dimensional array of filter coefficients corresponding to a second set of filter support positions within the block. The first one-dimensional array may be selected to comprise more filter coefficients than the second one-dimensional array based on a scanning order associated with the block (1206).

Video decoder 30 may further generate a prediction block of pixels based on one or more of the computed sub-pixel values (1208). For example, the prediction block of pixels may be referred to as a "predictive block," and may be used to decode the block of video data as described above.

Finally, in some examples, video decoder 30 may receive an encoded residual block of pixels, decode the residual block, and add the decoded residual block to the prediction block to generate a decoded block of pixels (1210). For example, the decoded block of pixels may also be a macroblock, or a TU of a CU, as also previously described.

In this manner, the method of FIG. 12 represents an example of a method of coding blocks of video data that includes obtaining a block of pixels comprising integer pixel values corresponding to integer pixel positions within the block, computing sub-pixel values corresponding to sub-pixel positions associated with the block, wherein computing the sub-pixel values includes computing a first sub-pixel value by applying a first interpolation filter defining a first one-dimensional array of filter coefficients corresponding to a first set of filter support positions within the block, and computing a second sub-pixel value by applying a second interpolation filter defining a second one-dimensional array of filter coefficients corresponding to a second set of filter support positions within the block, wherein the first one-dimensional array is selected to comprise more filter coefficients than the second one-dimensional array based on a scanning order associated with the block, and generating a prediction block of pixels based on one or more of the computed sub-pixel values.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding blocks of video data, the method comprising:
   obtaining a square block of pixels comprising integer pixel values corresponding to integer pixel positions within the square block of pixels;
   computing sub-pixel values corresponding to sub-pixel positions associated with the square block of pixels, computing the sub-pixel values comprises:
      computing a first sub-pixel value by applying a first interpolation filter defining a first one-dimensional array of filter coefficients corresponding to a first set of filter support positions within the square block of pixels; and
      computing a second sub-pixel value by applying a second interpolation filter defining a second one-dimensional array of filter coefficients corresponding to a second set of filter support positions within the square block of pixels, the first one-dimensional array comprising more filter coefficients than the second one-dimensional array, and
      computing a third sub-pixel value by applying a third interpolation filter defining two or more arrays of filter coefficients corresponding to a two-dimensional set of filter support positions within the square block of pixels, one of a horizontal dimension or a vertical dimension of the two or more arrays of filter coefficients selected to comprise more filter coefficients than another one of the horizontal dimension and the vertical dimension of the two or more arrays of filter coefficients based on a scanning order for the square block of pixels; and
   generating a prediction block of pixels based on one or more of the computed sub-pixel values.

2. The method of claim 1, wherein the first set of filter support positions comprises filter support positions arranged in parallel relative to the scanning order for the square block of pixels, and wherein the second set of filter support positions comprise filter support positions arranged perpendicular relative to the scanning order for the square block of pixels.

3. The method of claim 1, wherein one of the first set of filter support positions and the second set of filter support positions comprises a set of horizontal filter support positions arranged in a common row within the square block of pixels, and another one of the first set of filter support positions and the second set of filter support positions comprises a set of vertical filter support positions arranged in a common column within the square block of pixels.

4. The method of claim 1, wherein:
   the first one-dimensional array of filter coefficients comprises 8 coefficients;
   and the second one-dimensional array of filter coefficients comprises 6 coefficients.

5. The method of claim 1, wherein:
   the first one-dimensional array of filter coefficients comprises 8 coefficients;
   and the second one-dimensional array of filter coefficients comprises 7 coefficients.

6. The method of claim 1, wherein at least one of the first set of filter support positions and the second set of filter support positions corresponds to a set of integer pixel positions within the square block of pixels.

7. The method of claim 1, wherein at least one of the first sub-pixel and the second sub-pixel is located on one of a common horizontal axis with integer pixel positions within the square block of pixels, and a common vertical axis with integer pixel positions within the square block of pixels.

8. The method of claim 1, wherein one of the following conditions is met:
   one of the filter support positions of the first set of filter support positions corresponds to a sub-pixel position within the square block of pixels corresponding to the second sub-pixel value; and
   one of the filter support positions of the second set of filter support positions corresponds to a sub-pixel position within the square block of pixels corresponding to the first sub-pixel value.

9. The method of claim 1, further comprising:
   coding one or more signaling bits that identify one or more of a number of the filter coefficients included within each of the first and second one-dimensional arrays, and a value of each of the filter coefficients.

10. The method of claim 1, wherein the one of the horizontal dimension and the vertical dimension selected to comprise more filter coefficients is parallel relative to the scanning order for the square block of pixels.

11. The method of claim 1, wherein:
    the one of the horizontal dimension and the vertical dimension of the two or more arrays of filter coefficients comprises 8 coefficients; and
    the other one of the horizontal dimension and the vertical dimension of the two or more arrays comprises 6 coefficients.

12. The method of claim 1, wherein:
the one of the horizontal dimension and the vertical dimension of the two or more arrays of filter coefficients comprises 8 coefficients; and
the other one of the horizontal dimension and the vertical dimension of the two or more arrays comprises 7 coefficients.

13. The method of claim 1, further comprising:
coding one or more signaling bits that identify one or more of a number of the filter coefficients included within the two or more arrays and a value of each of the filter coefficients.

14. The method of claim 1, wherein the method forms part of a video encoding process, wherein the square block of pixels comprises a reference block of pixels, and wherein the method further comprises:
receiving a block of pixels to be encoded, wherein the block of pixels to be encoded is different than the reference block of pixels;
subtracting the prediction block from the block of pixels to be encoded to generate a residual block of pixels; and
encoding the residual block.

15. The method of claim 1, wherein the method forms part of a video decoding process, wherein the square block of pixels comprises a reference block of pixels, and wherein the method further comprises: receiving an encoded residual block of pixels; decoding the residual block; and
adding the decoded residual block to the prediction block to generate a decoded block of pixels, wherein the decoded block of pixels is different than the reference block of pixels.

16. An apparatus for coding blocks of video data, the apparatus comprising:
a memory configured to store the blocks of video data; and
a video coder comprising one or more processors configured to:
obtain a square block of pixels from the blocks of video data stored in the memory, the square block of pixels comprising integer pixel values corresponding to integer pixel positions within the square block of pixels;
compute sub-pixel values corresponding to sub-pixel positions associated with the square block of pixels, to compute the sub-pixel values, the video coder is configured to:
compute a first sub-pixel value by applying a first interpolation filter defining a first one-dimensional array of filter coefficients corresponding to a first set of filter support positions within the square block of pixels; and
compute a second sub-pixel value by applying a second interpolation filter defining a second one-dimensional array of filter coefficients corresponding to a second set of filter support positions within the square block of pixels, the first one-dimensional array comprising more filter coefficients than the second one-dimensional array, and
compute a third sub-pixel value by applying a third interpolation filter defining two or more arrays of filter coefficients corresponding to a two-dimensional set of filter support positions within the square block of pixels, one of a horizontal dimension and a vertical dimension of the two or more arrays of filter coefficients selected to comprise more filter coefficients than the other of the horizontal dimension and the vertical dimension of the two or more arrays based on a scanning order for the square block of pixels; and
generate a prediction block of pixels based on one or more of the computed sub-pixel values.

17. The method of claim 16, wherein the first set of filter support positions comprises filter support positions arranged in parallel relative to the scanning order for the square block of pixels, and the second set of filter support positions comprises filter support positions arranged perpendicular relative to the scanning order for the square block of pixels.

18. The apparatus of claim 16, wherein one of the first set of filter support positions and the second set of filter support positions comprises a set of horizontal filter support positions arranged in a common row within the square block of pixels, and another one of the first set of filter support positions and the second set of filter support positions comprises a set of vertical filter support positions arranged in a common column within the square block of pixels.

19. The apparatus of claim 16, wherein:
the first one-dimensional array of filter coefficients comprises 8 coefficients;
and the second one-dimensional array of filter coefficients comprises 6 coefficients.

20. The apparatus of claim 16, wherein:
the first one-dimensional array of filter coefficients comprises 8 coefficients;
and the second one-dimensional array of filter coefficients comprises 7 coefficients.

21. The apparatus of claim 16, wherein at least one of the first set of filter support positions and the second set of filter support positions corresponds to a set of integer pixel positions within the square block of pixels.

22. The apparatus of claim 16, wherein at least one of the first sub-pixel and the second sub-pixel is located on one of a common horizontal axis with integer pixel positions within the square block of pixels, and a common vertical axis with integer pixel positions within the square block of pixels.

23. the apparatus of claim 16, wherein one of the following conditions is met:
one of the filter support positions of the first set of filter support positions corresponds to a sub-pixel position within the square block of pixels corresponding to the second sub-pixel value; and
one of the filter support positions of the second set of filter support positions corresponds to a sub-pixel position within the square block of pixels corresponding to the first sub-pixel value.

24. The apparatus of claim 16, wherein the video coder is further configured to:
code one or more signaling bits that identify one or more of a number of the filter coefficients included within each of the first and second one-dimensional arrays, and a value of each of the filter coefficients.

25. The apparatus of claim 16, wherein the one of the horizontal dimension and the vertical dimension selected to comprise more filter coefficients is parallel relative to the scanning order for the square block of pixels.

26. The apparatus of claim 16, wherein:
the one of the horizontal dimension and the vertical dimension of the two or more arrays of filter coefficients comprises 8 coefficients; and
the other one of the horizontal dimension and the vertical dimension of the two-dimensional array comprises 6 coefficients.

27. The apparatus of claim 16, wherein:
  the one of the horizontal dimension and the vertical dimension of the two or more arrays of filter coefficients comprises 8 coefficients; and
  the other one of the horizontal dimension and the vertical dimension of the two or more arrays comprises 7 coefficients.

28. The apparatus of claim 16, wherein the video coder is further configured to:
  code one or more signaling bits that identify one or more of a number of the filter coefficients included within the two or more arrays and a value of each of the filter coefficients.

29. The apparatus of claim 16, wherein the video coder comprises a video encoder, wherein the square block of pixels comprises a reference block of pixels, and wherein the video encoder is further configured to:
  receive a block of pixels to be encoded, wherein the block of pixels to be encoded is different than the reference block of pixels;
  subtract the prediction block from the block of pixels to be encoded to generate a residual block of pixels; and
  encode the residual block.

30. The apparatus of claim 16, wherein the video coder comprises a video decoder, wherein the square block of pixels comprises a reference block of pixels, and wherein the video decoder is further configured to:
  receive an encoded residual block of pixels;
  decode the residual block; and
  add the decoded residual block to the prediction block to generate a decoded block of pixels, wherein the decoded block of pixels is different than the reference block of pixels.

31. The apparatus of claim 16, wherein the apparatus comprises at least one of:
  an integrated circuit;
  a microprocessor; or
  a wireless communication device that includes the video coder.

32. A device for coding blocks of video data, the device comprising:
  means for obtaining a square block of pixels comprising integer pixel values corresponding to integer pixel positions within the square block of pixels;
  means for computing sub-pixel values corresponding to sub-pixel positions associated with the square block of pixels, the means for computing the sub-pixel values comprises:
    means for computing a first sub-pixel value by applying a first interpolation filter defining a first one-dimensional array of filter coefficients corresponding to a first set of filter support positions within the square block of pixels; and
    means for computing a second sub-pixel value by applying a second interpolation filter defining a second one-dimensional array of filter coefficients corresponding to a second set of filter support positions within the square block of pixels, the first one-dimensional array comprising more filter coefficients than the second one-dimensional, and
    means for computing a third sub-pixel value by applying a third interpolation filter defining two or more arrays of filter coefficients corresponding to a two-dimensional set of filter support positions within the square block of pixels, one of a horizontal dimension and a vertical dimension of the two or more arrays of filter coefficients selected to comprise more filter coefficients than another one of the horizontal dimension and the vertical dimension of the two or more arrays based on a scanning order associated with the square block of pixels;
  means for generating a prediction block of pixels based on one or more of the computed sub-pixel values.

33. The device of claim 32, wherein the first set of filter support positions comprises filter support positions arranged in parallel relative to the scanning order for the square block of pixels, and wherein the second set of filter support positions comprises filter support positions arranged perpendicular relative to the scanning order for the square block of pixels.

34. The device of claim 32, wherein one of the first set of filter support positions and the second set of filter support positions comprises a set of horizontal filter support positions arranged in a common row within the square block of pixels, and another one of the first set of filter support positions and the second set of filter support positions comprises a set of vertical filter support positions arranged in a common column within the square block of pixels.

35. The device of claim 32, wherein:
  the first one-dimensional array of filter coefficients comprises 8 coefficients;
  and the second one-dimensional array of filter coefficients comprises 6 coefficients.

36. The device of claim 32, wherein:
  the first one-dimensional array of filter coefficients comprises 8 coefficients;
  and the second one-dimensional array of filter coefficients comprises 7 coefficients.

37. The device of claim 32, wherein at least one of the first set of filter support positions and the second set of filter support positions corresponds to a set of integer pixel positions within the square block of pixels.

38. The device of claim 32, wherein at least one of the first sub-pixel and the second sub-pixel is located on one of a common horizontal axis with integer pixel positions within the square block of pixels, and a common vertical axis with integer pixel positions within the square block of pixels.

39. The device of claim 32, wherein one of the following conditions is met:
  one of the filter support positions of the first set of filter support positions corresponds to a sub-pixel position within the square block of pixels corresponding to the second sub-pixel value; and
  one of the filter support positions of the second set of filter support positions corresponds to a sub-pixel position within the square block of pixels corresponding to the first sub-pixel value.

40. The device of claim 32, further comprising:
  means for coding one or more signaling bits that identify one or more of a number of the filter coefficients included within each of the first and second one-dimensional arrays, and a value of each of the filter coefficients.

41. The device of claim 32, wherein the one of the horizontal dimension and the vertical dimension selected to comprise more filter coefficients is parallel relative to the scanning order for the square block of pixels.

42. The device of claim 32, wherein:
  the one of the horizontal dimension and the vertical dimension of the two or more arrays of filter coefficients comprises 8 coefficients; and
  the other one of the horizontal dimension and the vertical dimension of the two or more arrays comprises 6 coefficients.

43. The device of claim 32, wherein:
the one of the horizontal dimension and the vertical dimension of the two or more arrays of filter coefficients comprises 8 coefficients; and
the other one of the horizontal dimension and the vertical dimension of the two or more arrays comprises 7 coefficients.

44. The device of claim 32, further comprising:
means for coding one or more signaling bits that identify one or more of a number of the filter coefficients included within the two or more arrays and a value of each of the filter coefficients.

45. The device of claim 32, wherein the device is used as part of a video encoding process, wherein the square block of pixels comprises a reference block of pixels, and wherein the device further comprises:
means for receiving a block of pixels to be encoded, wherein the block of pixels to be encoded is different than the reference block of pixels;
means for subtracting the prediction block from the block of pixels to be encoded to generate a residual block of pixels; and
means for encoding the residual block.

46. The device of claim 32, wherein the device is used as part of a video decoding process, wherein the square block of pixels comprises a reference block of pixels, and wherein the device further comprises:
means for receiving an encoded residual block of pixels;
means for decoding the residual block; and
means for adding the decoded residual block to the prediction block to generate a decoded block of pixels, wherein the decoded block of pixels is different than the reference block of pixels.

47. A computer-readable storage medium comprising instructions that, when executed, cause one or more processors of a video coding device to:
obtain a square block of pixels comprising integer pixel values corresponding to integer pixel positions within the square block of pixels;
compute sub-pixel values corresponding to sub-pixel positions associated with the square block of pixels, wherein the instructions cause the one or more processors to:
compute a first sub-pixel value by applying a first interpolation filter defining a first one-dimensional array of filter coefficients corresponding to a first set of filter support positions within the square block of pixels; and
compute a second sub-pixel value by applying a second interpolation filter defining a second one-dimensional array of filter coefficients corresponding to a second set of filter support positions within the square block of pixels, the first one-dimensional array comprising more filter coefficients than the second one-dimensional array, and
compute a third sub-pixel value by applying a third interpolation filter defining two or more arrays of filter coefficients corresponding to a two-dimensional set of filter support positions within the square block of pixels, one of a horizontal dimension and a vertical dimension of the two or more arrays selected to comprise more filter coefficients than another one of the horizontal dimension and the vertical dimension of the two or more arrays based on a scanning order for the square block of pixels; and
generate a prediction block of pixels based on one or more of the computed sub-pixel values.

48. The computer-readable storage medium of claim 47, wherein the first set of filter support positions comprises filter support positions arranged in parallel relative to the scanning order for the square block of pixels, and the second set of filter support positions comprises filter support positions arranged perpendicular relative to the scanning order for the square block of pixels.

49. The computer-readable storage medium of claim 47, wherein one of the first set of filter support positions and the second set of filter support positions comprises a set of horizontal filter support positions arranged in a common row within the square block of pixels, and another one of the first set of filter support positions and the second set of filter support positions comprises a set of vertical filter support positions arranged in a common column within the square block of pixels.

50. The computer-readable storage medium of claim 47, wherein:
the first one-dimensional array of filter coefficients comprises 8 coefficients;
and the second one-dimensional array of filter coefficients comprises 6 coefficients.

51. The computer-readable storage medium of claim 47, wherein:
the first one-dimensional array of filter coefficients comprises 8 coefficients;
and the second one-dimensional array of filter coefficients comprises 7 coefficients.

52. The computer-readable storage medium of claim 47, wherein at least one of the first set of filter support positions and the second set of filter support positions corresponds to a set of integer pixel positions within the square block of pixels.

53. The computer-readable storage medium of claim 47, wherein at least one of the first sub-pixel and the second sub-pixel is located on one of a common horizontal axis with integer pixel positions within the square block of pixels, and a common vertical axis with integer pixel positions within the square block of pixels.

54. The computer-readable storage medium of claim 47, wherein one of the following conditions is met:
one of the filter support positions of the first set of filter support positions corresponds to a sub-pixel position within the square block of pixels corresponding to the second sub-pixel value; and
one of the filter support positions of the second set of filter support positions corresponds to a sub-pixel position within the square block of pixels corresponding to the first sub-pixel value.

55. The computer-readable storage medium of claim 47, further comprising instructions that cause the one or more processors to:
code one or more signaling bits that identify one or more of a number of the filter coefficients included within each of the first and second one-dimensional arrays, and a value of each of the filter coefficients.

56. The computer-readable storage medium of claim 47, wherein the one of the horizontal dimension and the vertical dimension selected to comprise more filter coefficients is parallel relative to the scanning order for the square block of pixels.

57. The computer-readable storage medium of claim 47, wherein:
the one of the horizontal dimension and the vertical dimension of the two or more arrays of filter coefficients comprises 8 coefficients; and the other one of the horizontal dimension and the vertical dimension of the two or more arrays comprises 6 coefficients.

58. The computer-readable storage medium of claim 47, wherein:
the one of the horizontal dimension and the vertical dimension of the two or more arrays of filter coefficients comprises 8 coefficients; and
the other one of the horizontal dimension and the vertical dimension of the two or more arrays comprises 7 coefficients.

59. The computer-readable storage medium of claim 47, further comprising instructions that cause the one or more processors to:
code one or more signaling bits that identify one or more of a number of the filter coefficients included within the two or more arrays and a value of each of the filter coefficients.

60. The computer-readable storage medium of claim 47, wherein the computer-readable storage medium is used as part of a video encoding process, and wherein the square block of pixels comprises a reference block of pixels, further comprising instructions that cause the one or more processors to:
receive a block of pixels to be encoded, wherein the block of pixels to be encoded is different than the reference block of pixels;
subtract the prediction block from the block of pixels to be encoded to generate a residual block of pixels; and
encode the residual block.

61. The computer-readable storage medium of claim 47, wherein the computer-readable storage medium is used as part of a video decoding process, and wherein the square block of pixels comprises a reference block of pixels, further comprising instructions that cause the one or more processors to:
receive an encoded residual block of pixels;
decode the residual block; and
add the decoded residual block to the prediction block to generate a decoded block of pixels, wherein the decoded block of pixels is different than the reference block of pixels.

* * * * *